(12) United States Patent
Kim

(10) Patent No.: US 9,628,133 B2
(45) Date of Patent: Apr. 18, 2017

(54) CASE HAVING PROTECTIVE FILM FOR ELECTRONIC DEVICE

(71) Applicant: SPIGEN KOREA CO, LTD., Seoul (KR)

(72) Inventor: Dae-Young Kim, Seoul (KR)

(73) Assignee: SPIGEN KOREA CO., LTD., Geumcheon-Gu, Seoul (KR)

(*) Notice: Subject to any disclaimer, the term of this patent is extended or adjusted under 35 U.S.C. 154(b) by 0 days.

(21) Appl. No.: 14/991,506

(22) Filed: Jan. 8, 2016

(65) Prior Publication Data

US 2016/0204817 A1 Jul. 14, 2016

Related U.S. Application Data

(60) Provisional application No. 62/101,609, filed on Jan. 9, 2015.

(51) Int. Cl.
  *H04B 1/38* (2015.01)
  *H04B 1/00* (2006.01)
  *H04B 1/3888* (2015.01)
  *H04M 1/02* (2006.01)

(52) U.S. Cl.
  CPC ............. *H04B 1/3888* (2013.01); *H04B 1/38* (2013.01); *H04M 1/0254* (2013.01)

(58) Field of Classification Search
  CPC .... H04B 1/3888; H04M 1/185; H04M 1/0283
  USPC ................. 455/575.8, 575.1, 90.3
  See application file for complete search history.

(56) References Cited

U.S. PATENT DOCUMENTS

| | | | | |
|---|---|---|---|---|
| 2011/0195759 A1* | 8/2011 | Griffin | .................. | H04M 1/026 455/575.1 |
| 2013/0296004 A1* | 11/2013 | Tages | ....................... | H05K 5/03 455/575.8 |
| 2014/0174960 A1* | 6/2014 | Zhu | ......................... | H04M 1/04 206/45.24 |
| 2014/0287801 A1* | 9/2014 | Ho | ....................... | H04B 1/3883 455/573 |
| 2015/0214991 A1* | 7/2015 | Ranchod | ................ | H04M 1/04 455/575.8 |
| 2015/0370288 A1* | 12/2015 | Dinesh | ................. | G06F 1/1656 455/566 |

* cited by examiner

*Primary Examiner* — Tilahun B Gesesse
(74) *Attorney, Agent, or Firm* — East West Law Group; Heedong Chae

(57) ABSTRACT

A case having a protective film for an electronic device includes a soft protective shell having a bottom and a side wall, a hard protective frame configured to removably mount over the bottom and side wall of the protective shell, and a protective film for covering the front portion of the electronic device. The soft protective shell significantly covers hack and side portions of the electronic device, but does not significantly covers a front portion of the electronic device. The protective shell further includes an inverted "L"-shaped recess for receiving and holding in place edges of the protective film. The case may further include a film frame for covering the protective film.

21 Claims, 37 Drawing Sheets

100

10

100

1

10

FIG. 6
FIG. 7
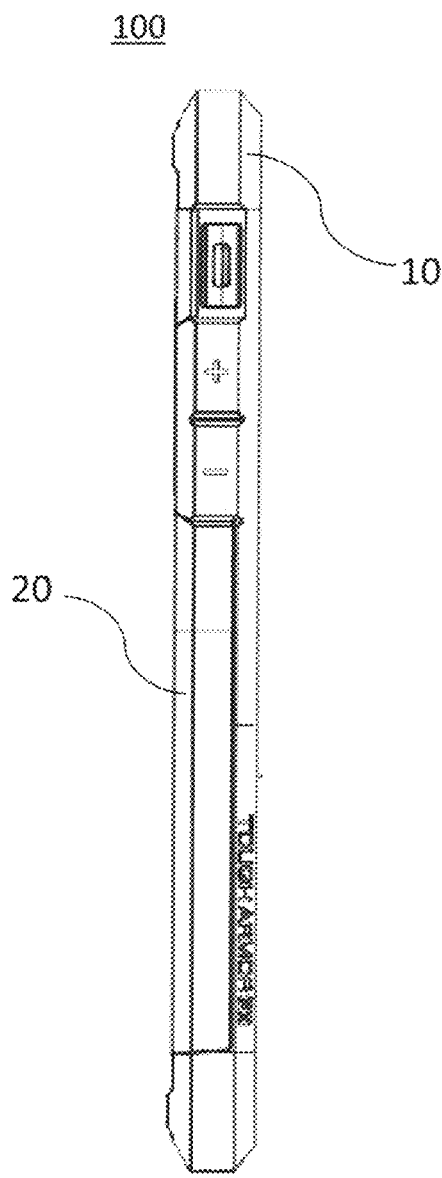
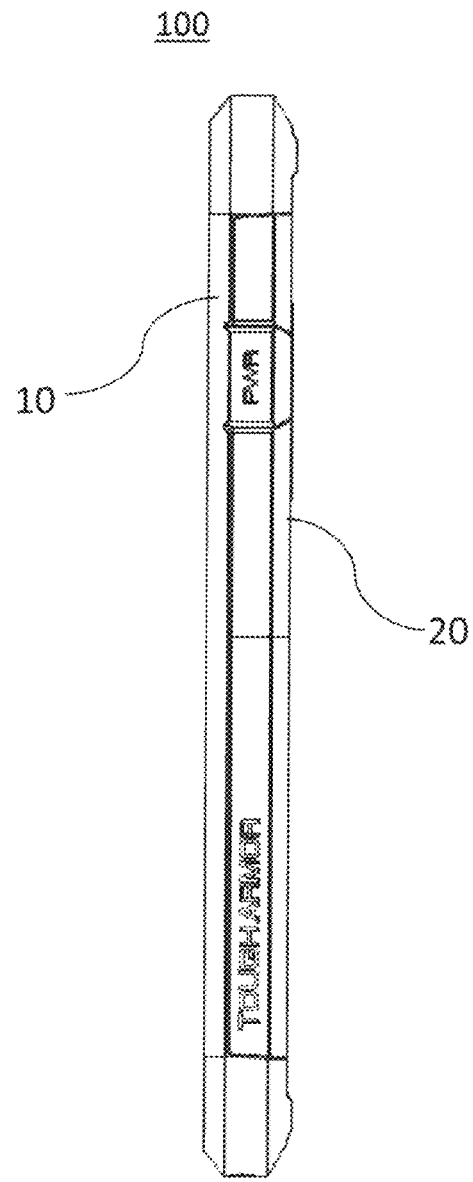

10

10

FIG. 16
FIG. 17
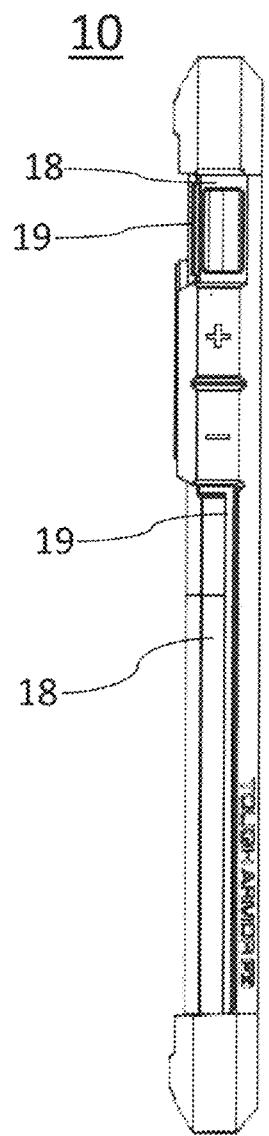
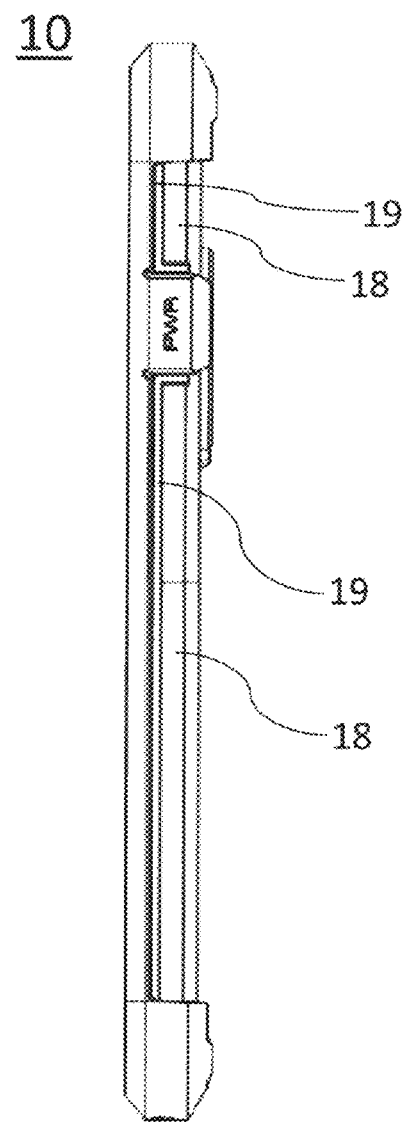

10

20

20

20

20

20

<u>20</u>

60

CASE HAVING PROTECTIVE FILM FOR ELECTRONIC DEVICE

CROSS-REFERENCE TO RELATED APPLICATIONS

This application claims priority to U.S. provisional patent application No. 62/101,609 filed Jan. 9, 2015, which is incorporated herein by reference.

FIELD OF THE INVENTION

The present invention relates to a case having a protective film for an electronic device and, more particularly, to a mobile phone case having a soft protective shell, a hard protective frame, and a protective film. The protective film is attached to the screen of the electronic device, and its edges are securely received by an inverted "L"-shaped recess of the soft protective shell. The electronic device may foe a mobile phone, smart phone, tablet computing device, or the like.

SUMMARY OF THE INVENTION

The present invention contrives to solve the disadvantages of the prior art. The present invention provides a case having a protective film for an electronic device.

The object of the invention is to provide a case having a protective film for an electronic device, comprising a soft protective, shell having a bottom and a side wall, a hard protective frame configured to removably mount over the bottom and side wall of the protective shell, and a protective film for covering the front portion of the electronic device. The soft protective shell significantly covers the back portion and side portion, of the electronic device, but does not significantly cover the front portion of the electronic device. The protective shell further includes an inverted "L"-shaped recess for receiving and holding in place edges of the protective film.

Another object of the invention is to provide a case having a protective film for an electronic device, comprising a soft protective shell, a hard protective frame configured to removably mount over the soft protective shell, and a protective film for covering a front portion of the electronic device. The protective shell further includes an inverted shaped recess for receiving and holding in place edges of the protective film. The inverted "L"-shaped recess is preferably formed continuously along four sides of the side wall.

Still another object of the invention is to provide a case having a protective film for an electronic device, comprising a soft protective shell, a hard protective frame configured to removably mount over the soft protective shell, and a protective film for covering the front portion of the electronic device. The protective shell further includes an inverted "L"-shaped recess for receiving and holding in place the edges of the protective film, and the inverted "L"-shaped recess is formed continuously along four sides of the side wall. The protective shell further comprises grooves formed on the inverted "L"-shaped recess, and the protective film comprises mating protrusions, wherein the mating protrusions mate with the grooves.

Still another object of the invention is to provide a case having a protective shell, a protective frame, a protective film, and a film frame. The film frame covers the protective film and the front portion of the electronic device. The film frame is received and secured in between the sides of the protective shell and the electronic device.

The advantages of the present invention are: (1) the case for an electronic device of the present invention has a protective film, for covering and protecting the screen of an electronic device which is securely held in place by an inverted "L"-shaped recess formed on the side wall of the soft protective shell of the case; (2) the case for an electronic device of the present invention provides multiple protections to an electronic device secured therein by a soft protective shell, a hard protective frame, and a protective film; (3) the inverted shaped recess receives edges of the protective film, and the edges of the protective film can be securely and tightly held, in place partially because of the pressure by the hard protective frame towards the soft protective shell and towards the direction of the electronic device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 6 shows a left elevational view of the case with an electronic device therein, according to the present invention;

FIG. 7 shows a right elevational view of the case with an electronic device therein according to the present invention.

FIG. 16 shows a left elevational view of the protective shell according to the present invention;

FIG. 17 shows a right elevational view of the protective shell according to the present invention;

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
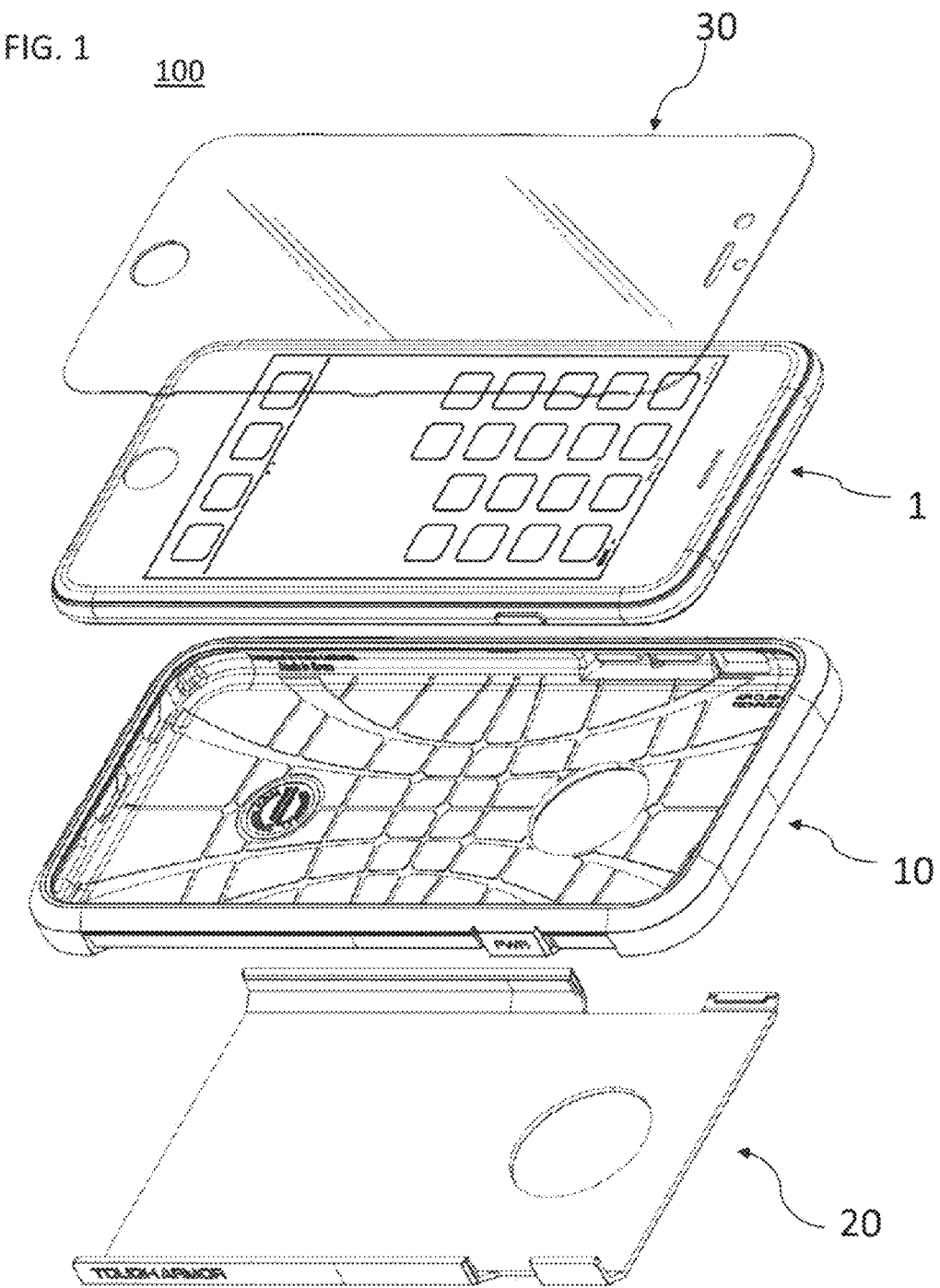
FIG. 1 shows a perspective exploded view of the case and an electronic device according to the present invention.
Figure 2:
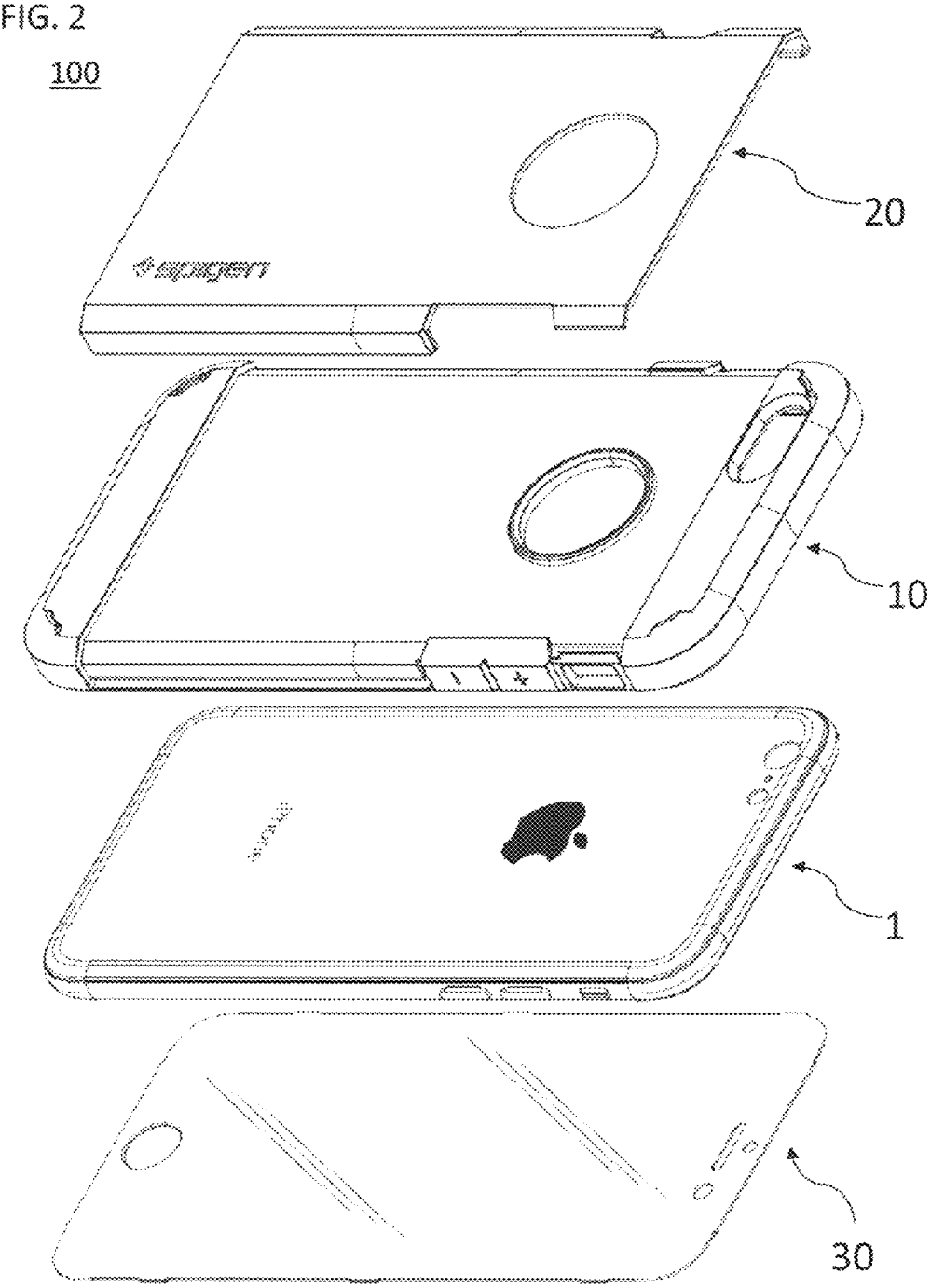
FIG. 2 shows another perspective exploded view of the case and an electronic device according to the present invention.
Figure 3:
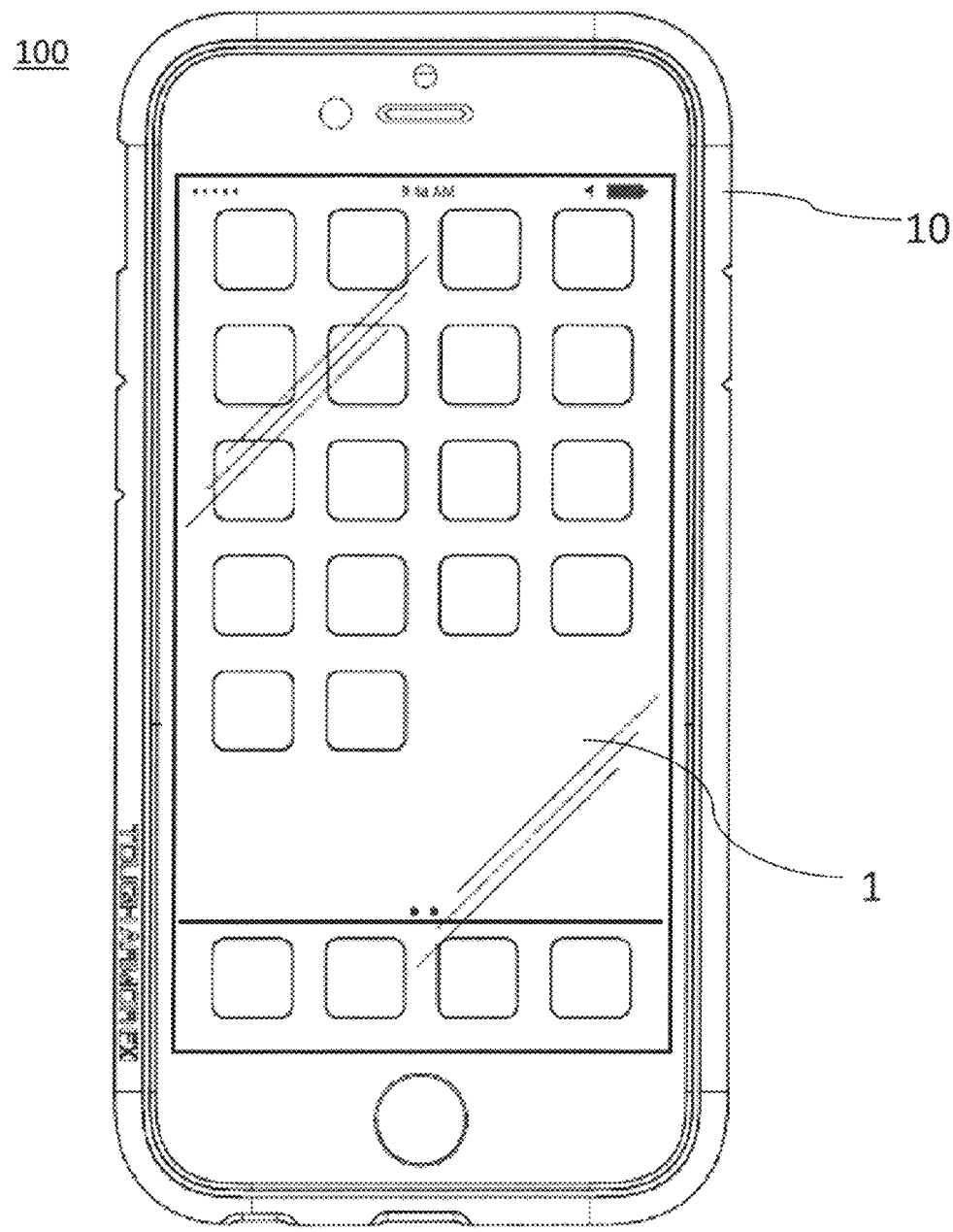
FIG. 3 shows a front elevational view of the case with an electronic device therein according to the present invention.
Figure 4:
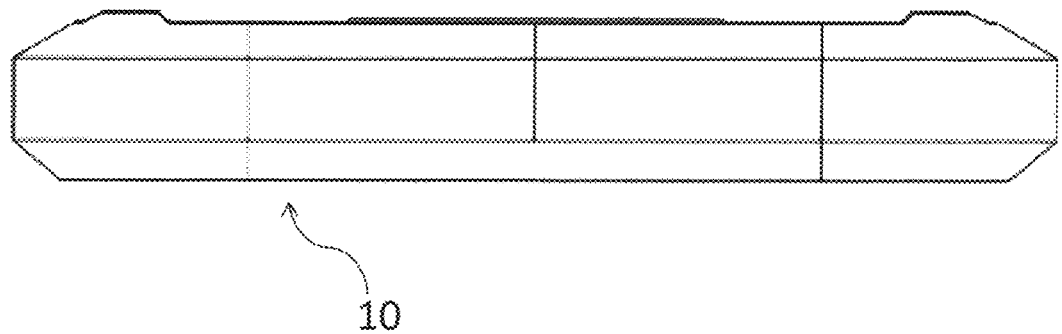
FIG. 4 shows a top view of the case with an electronic device therein according to the present invention.
Figure 5:
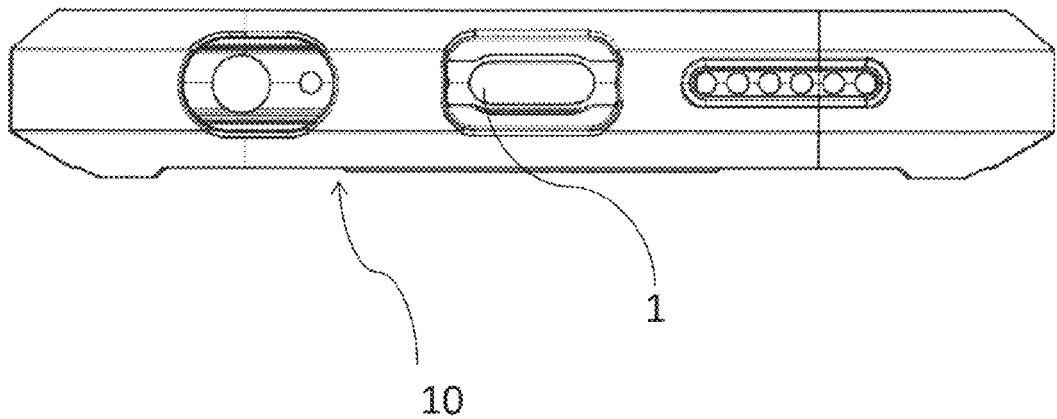
FIG. 5 shows a bottom view of the case with an electronic device therein according to the present invention.
Figure 8:
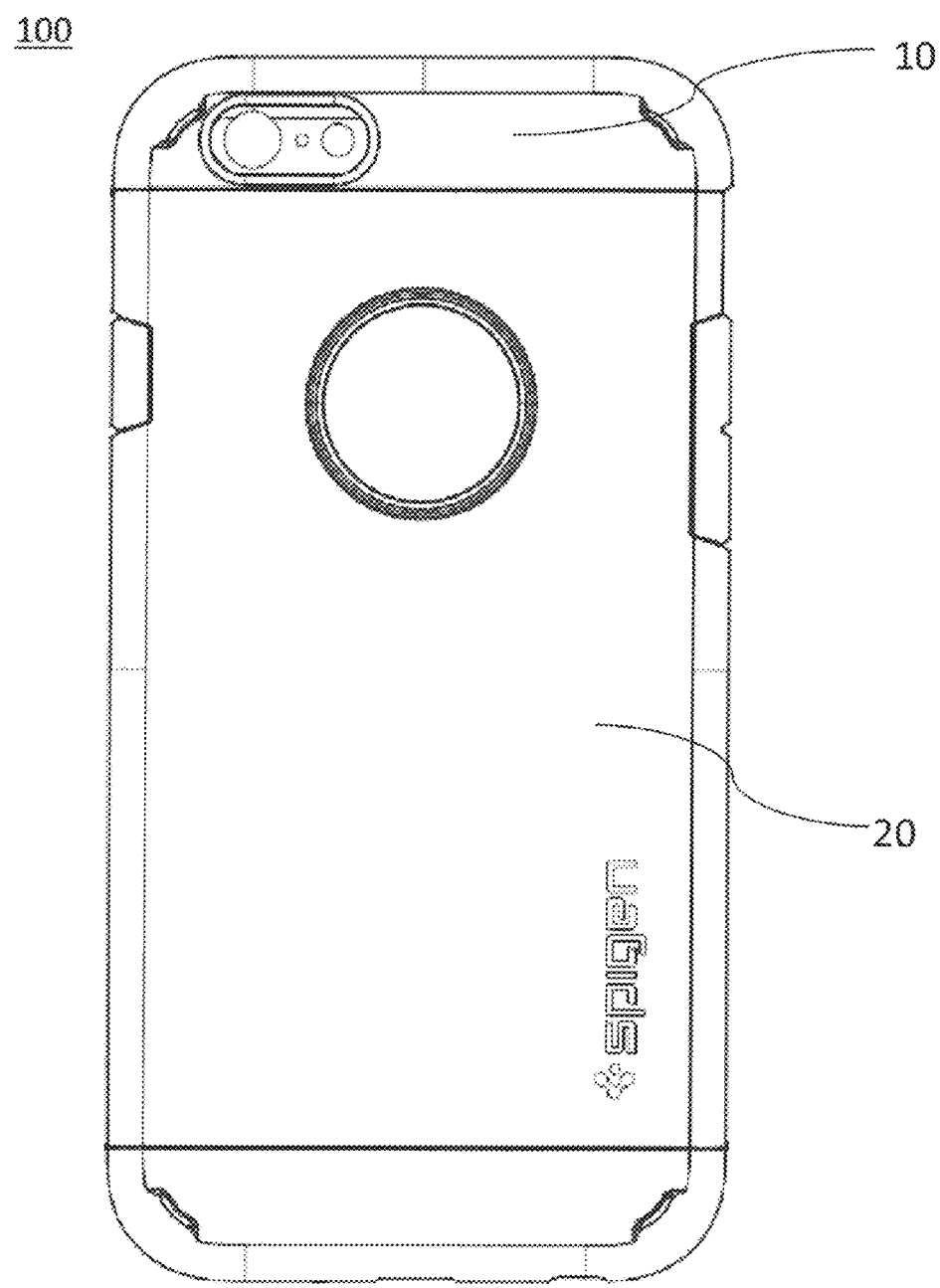
FIG. 8 shows a rear elevational view of the case with an electronic device therein according to the present invention.
Figure 9:
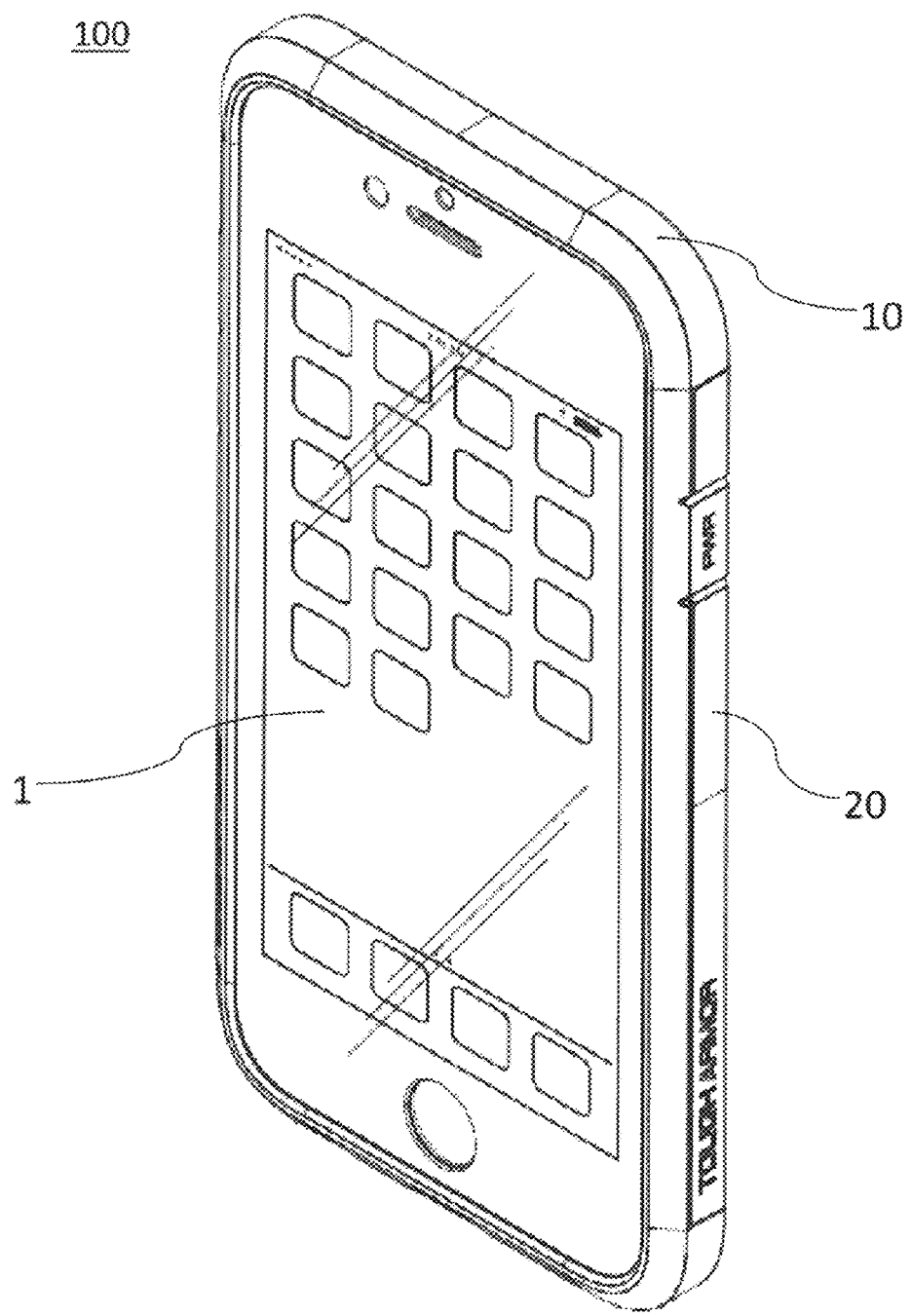
FIG. 9 shows a front perspective view of the case with an electronic device therein according to the present invention.
Figure 10:
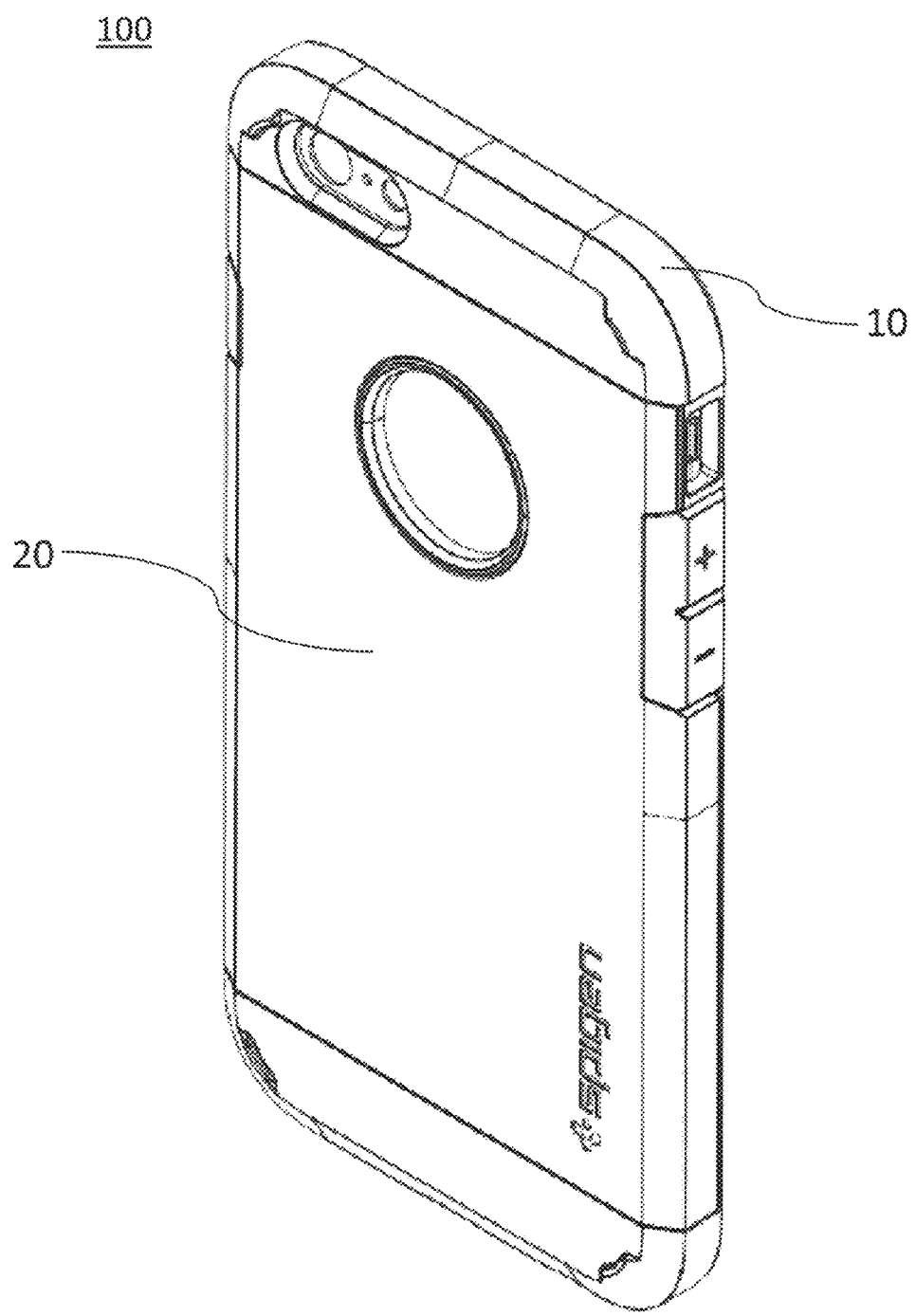
FIG. 10 shows a rear perspective view of the case with an electronic device therein according to the present invention.

FIGS. 1 and 2 show front and rear perspective exploded, views of the case and an electronic device.

FIGS. 3 through 10 show a front elevational view, a top view, a bottom view, a left elevational view, a right elevational view, a rear elevational view, a front perspective view, and a rear perspective view of the case with an electronic device therein.

The case 100, having a protective film 30 for an electronic device 1, comprises: a protective shell 10, a protective frame 20, and a protective film 30. The protective shell 10 protects and covers the electronic device 1 installed therein, significantly covering back 2 and side 3 portions of the electronic device 1, but without significantly covering a front portion 4 of the electronic device. The protective shell 10 comprises a bottom 12, covering the back portion 2 of the electronic device 1, and a side wall 13, extending from the bottom 12 and covering the side portion 3 of the electronic device 1. The protective frame 20 is configured to removably mount over the side wall 13 of the protective shell 10. The protective film 30 covers and protects the front portion 4 of the electronic device 1. In addition, the protective shell 10 further comprises an inverted "L"-shaped recess 14 for receiving and securely holding in place the edges of the protective film 30.

FIGS. 13 through 20 show various views of the protective shell 10.

The side wall 13 of the protective shell 10 comprises an inner bevel 15 and an outer bevel 16.

As shown in FIGS. 31 through 36, the inverted "L"-shaped recess 14 is formed right below the inner bevel 15 of the side wall 13. In addition, the inverted "L"-shaped recess 14 is formed continuously along four sides of the side wall 13 to receive all four edges of the protective film 30.

Figure 11:
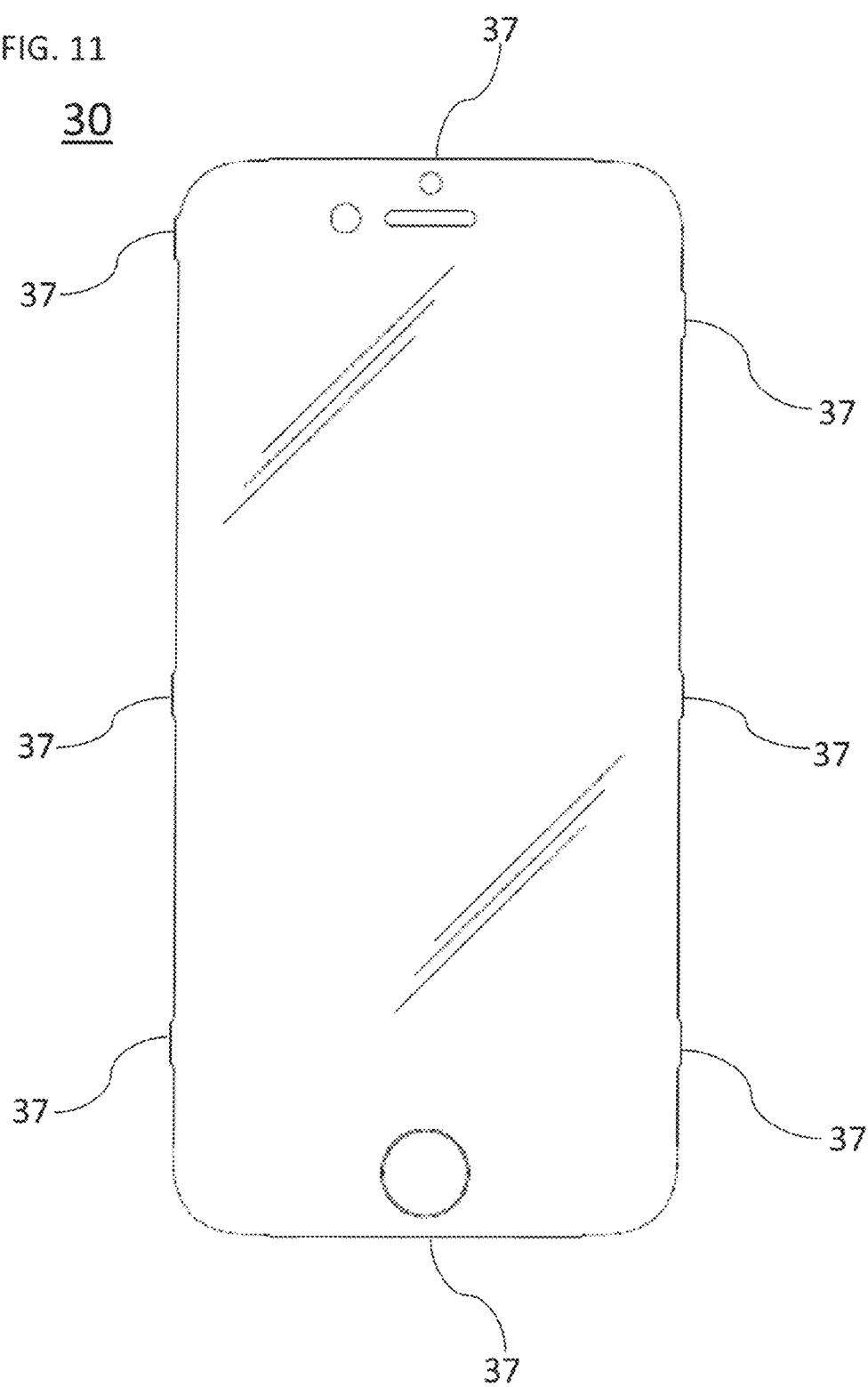
FIG. 11 shows a front elevational view of the protective film according to the present invention.
Figure 12:
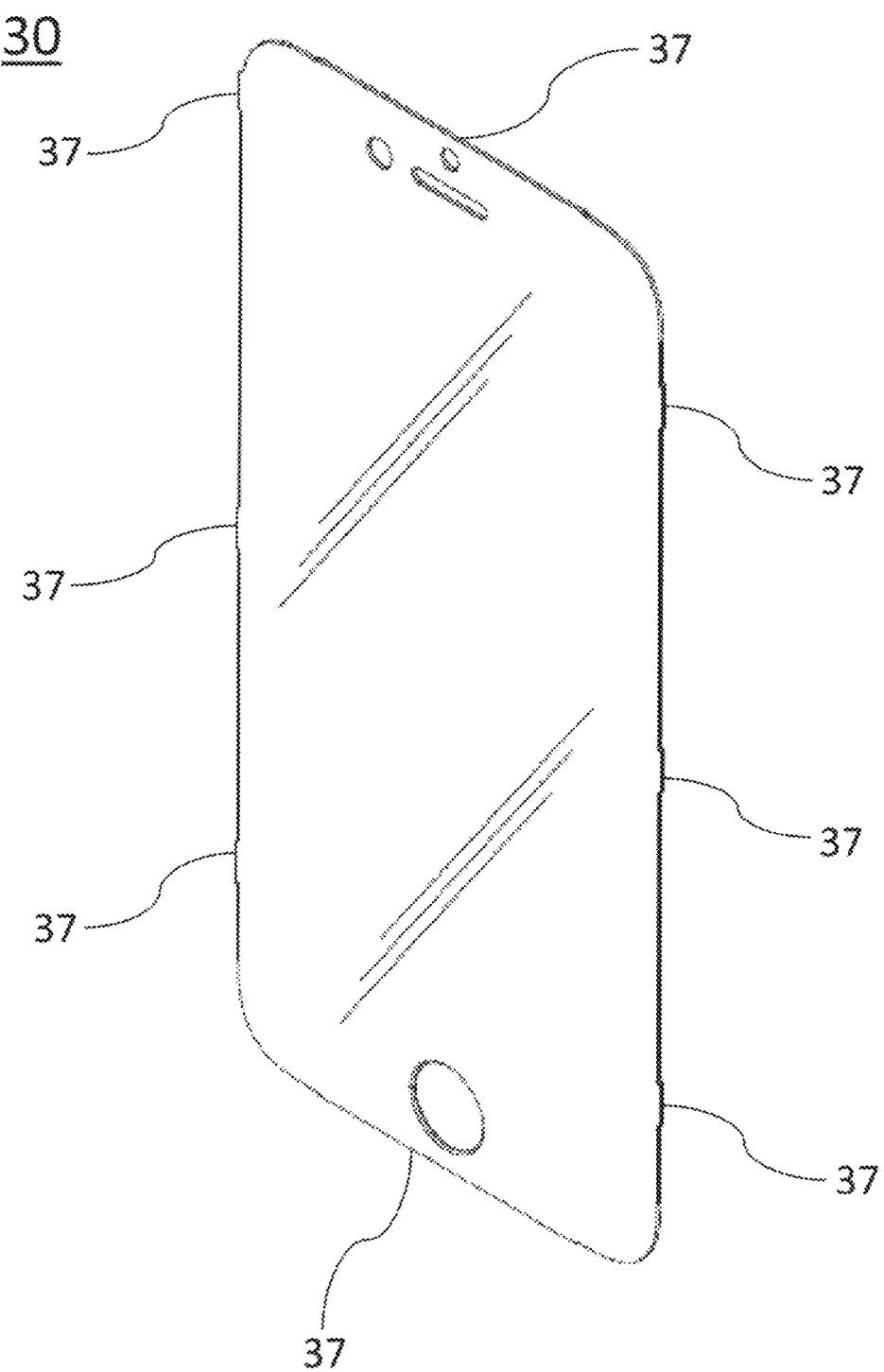
FIG. 12 shows a front perspective view of the protective film according to the present invention.
Figure 13:
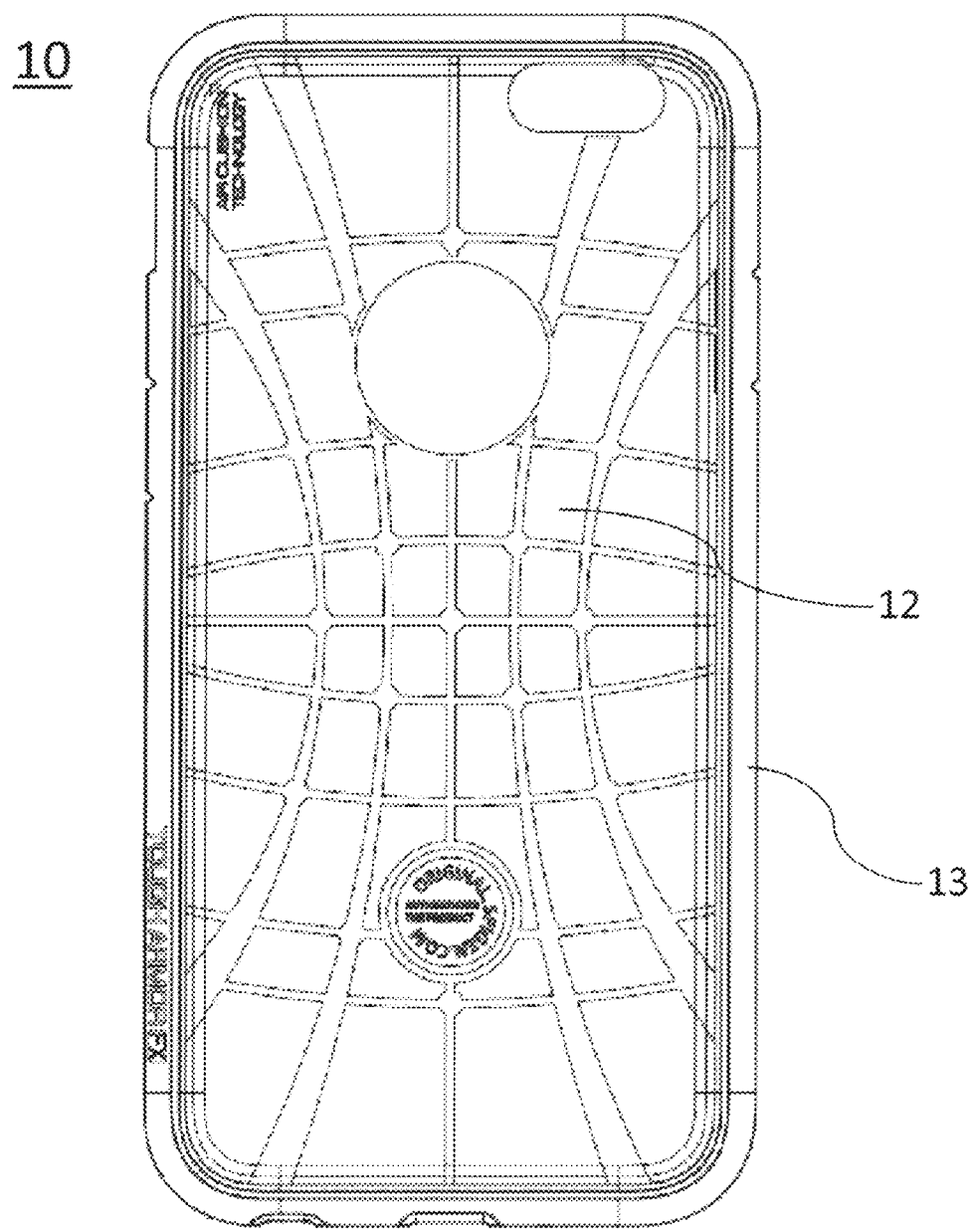
FIG. 13 shows a front elevational view of the protective shell according to the present invention.
Figure 14:
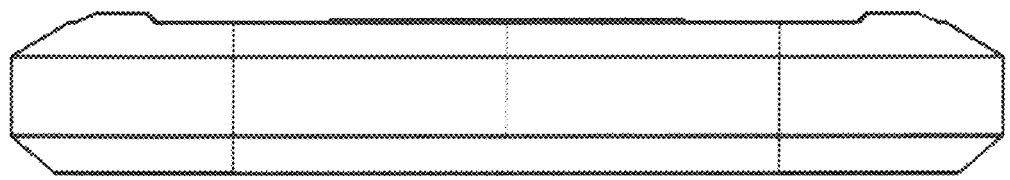
FIG. 14 shows a top view of the protective shell according to the present invention.
Figure 15:
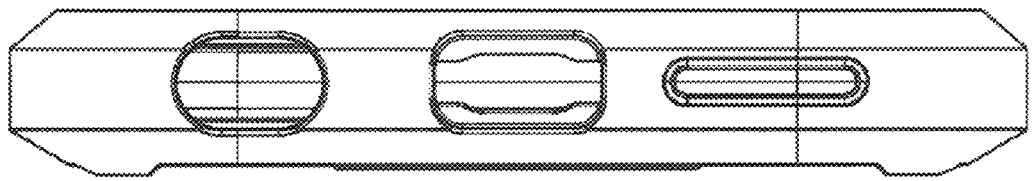
FIG. 15 shows a bottom view of the protective shell according to the present invention.
Figure 18:
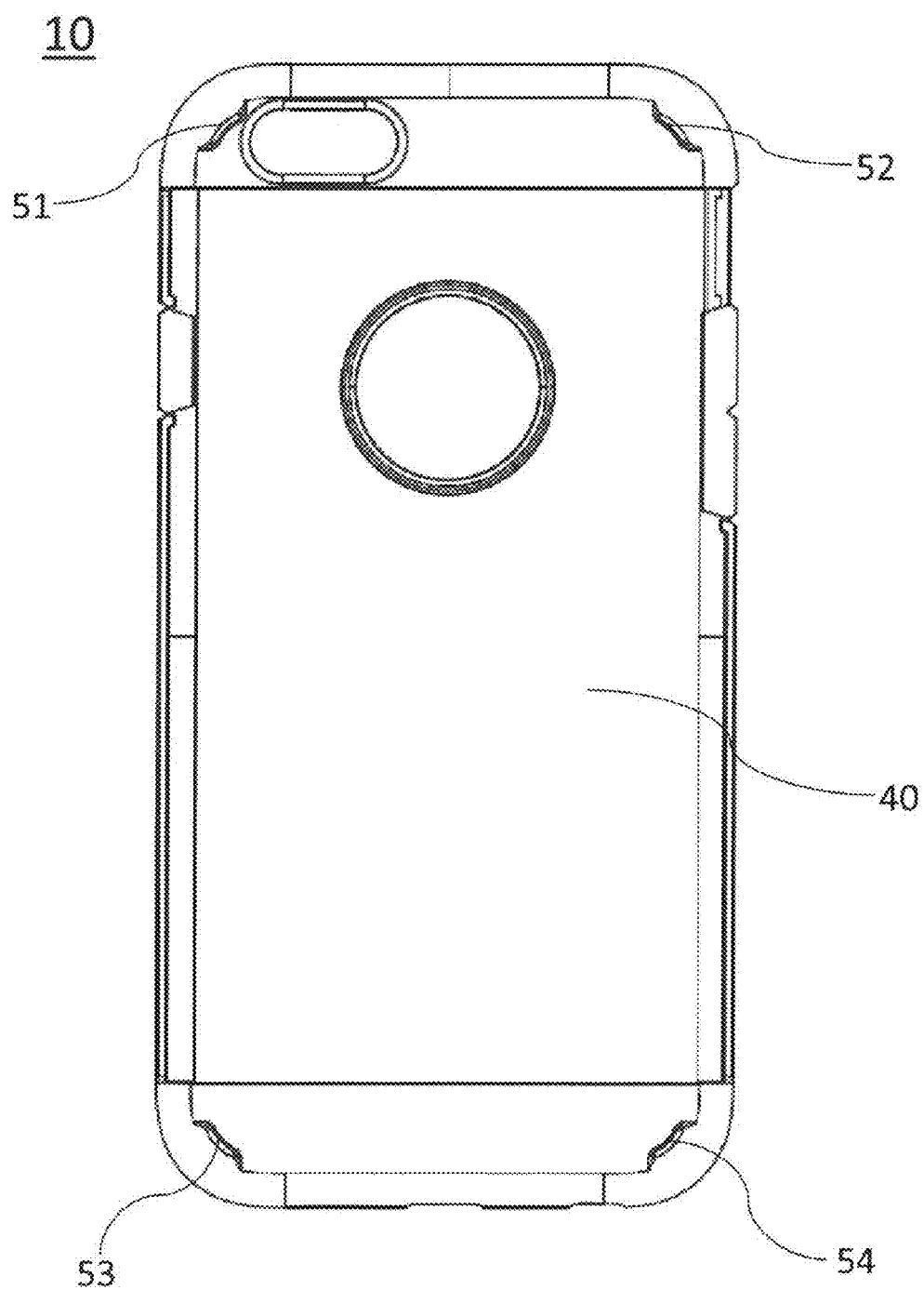
FIG. 18 shows a rear elevational view of the protective shell according to the present invention.
Figure 19:
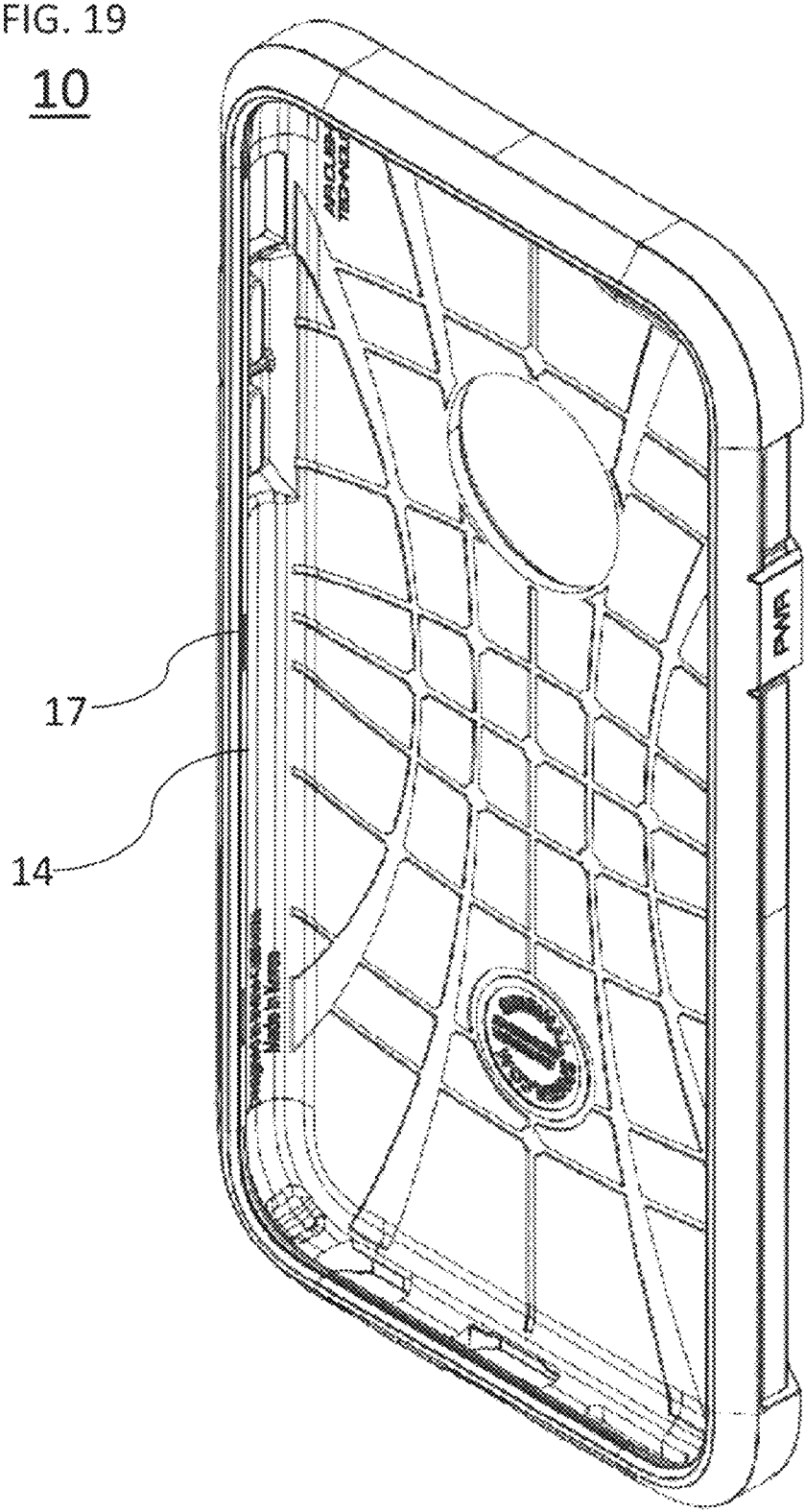
FIG. 19 shows a front perspective view of the protective shell according to the present invention.
Figure 20:
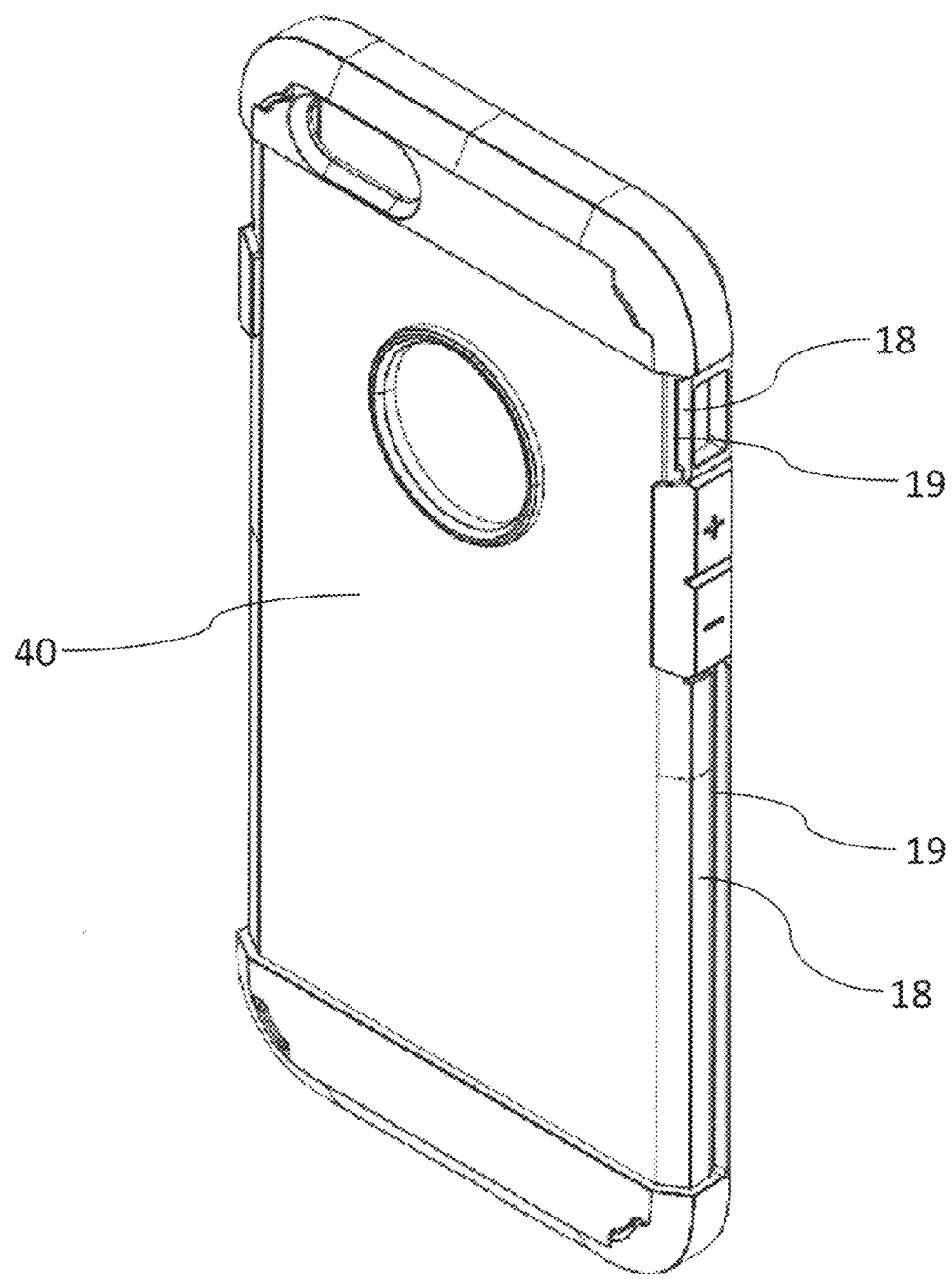
FIG. 20 shows a rear perspective view of the protective shell, according to the present invention.
Figure 21:
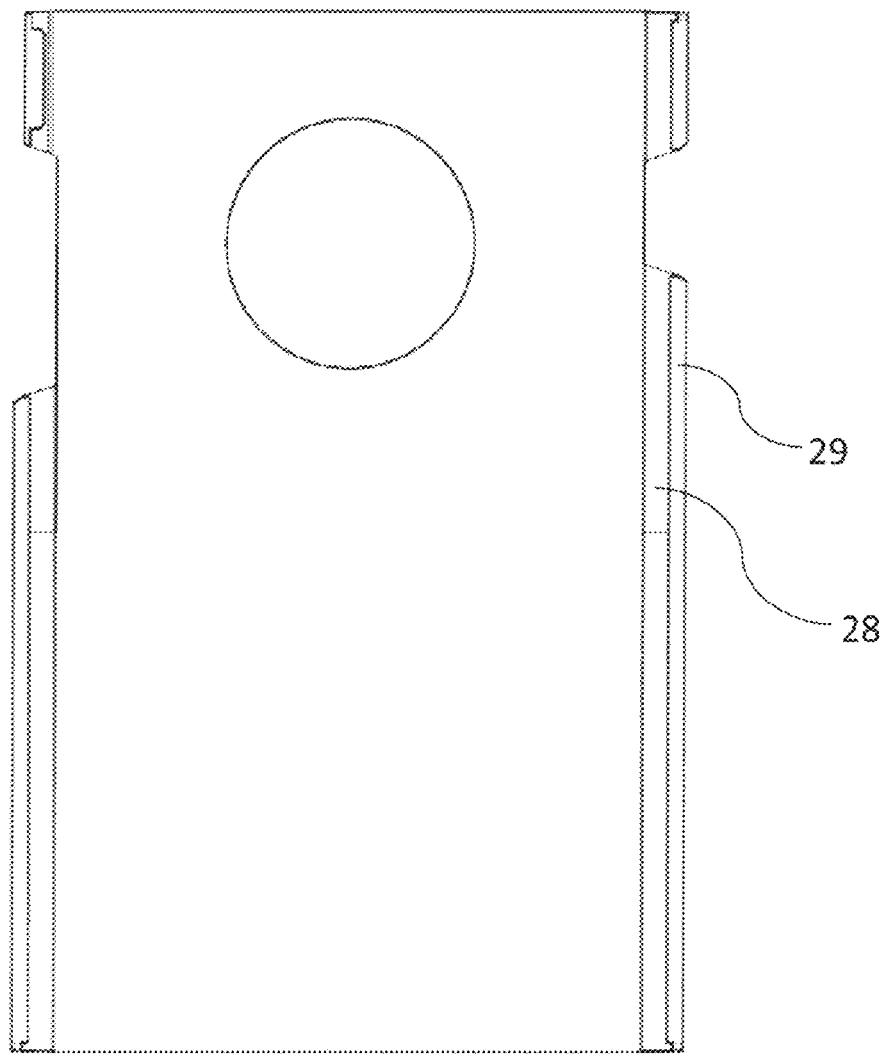
FIG. 21 shows a front elevational view of the protective frame according to the present invention.
Figure 22:
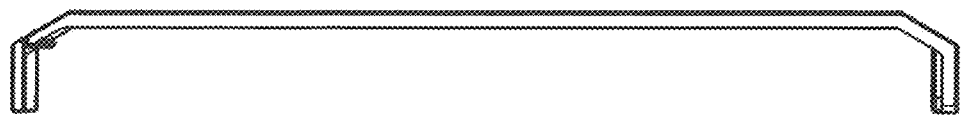
FIG. 22 shows a top view of the protective frame according to the present invention.
Figure 23:
FIG. 23 shows a bottom view of the protective frame according to the present invention.
Figure 24:
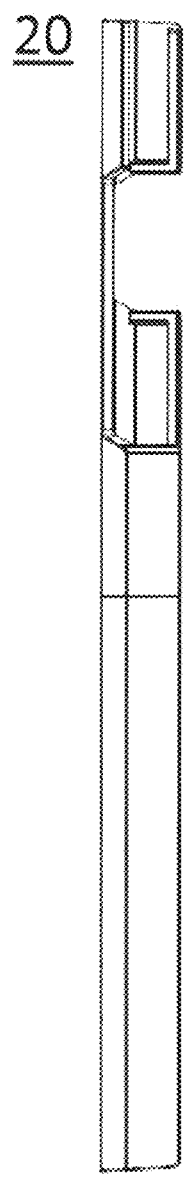
FIG. 24 shows a left elevational view of the protective frame according to the present invention.
Figure 25:
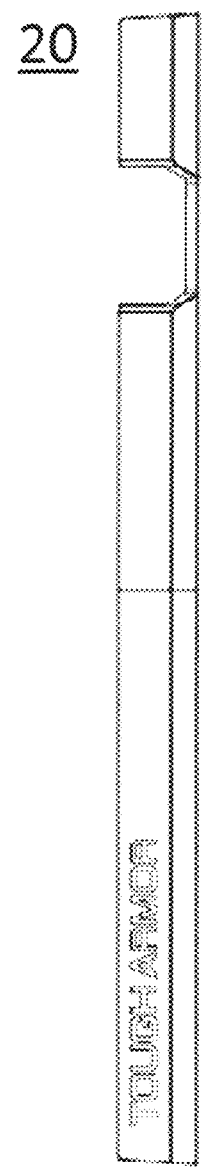
FIG. 25 shows a right elevational view of the protective frame according to the present invention.
Figure 26:
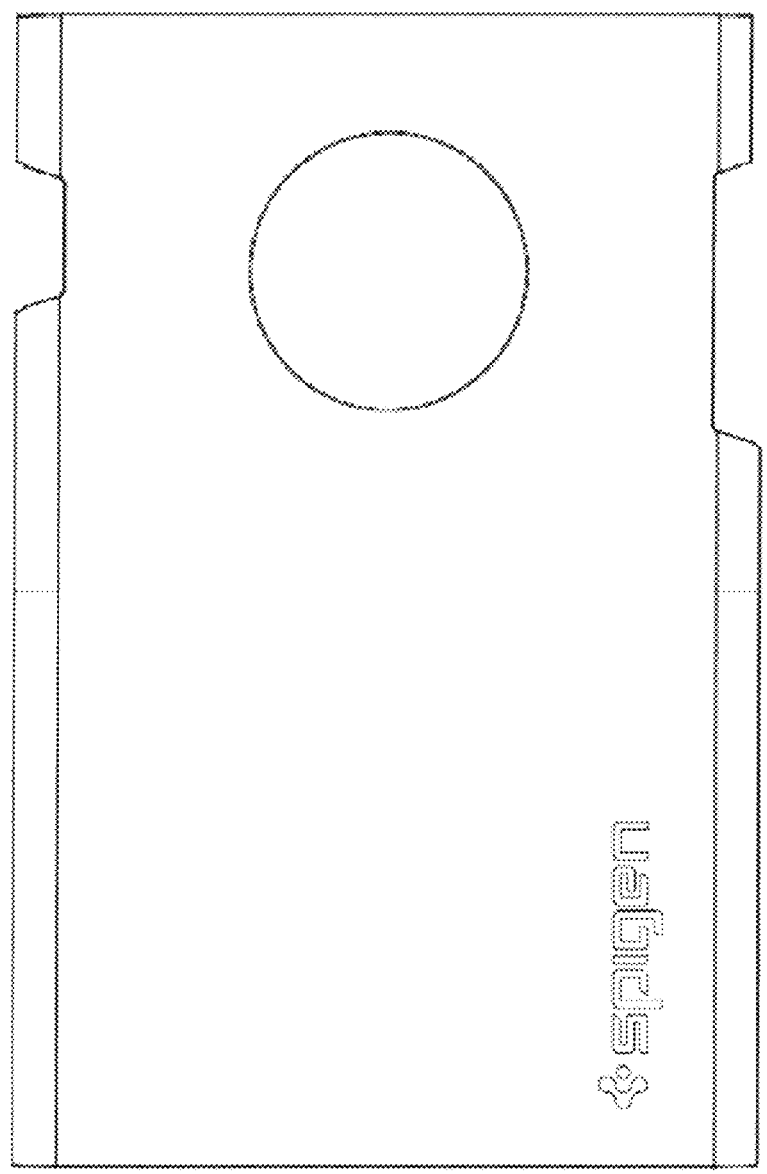
FIG. 26 shows a rear elevational view of the protective frame according to the present invention.
Figure 27:
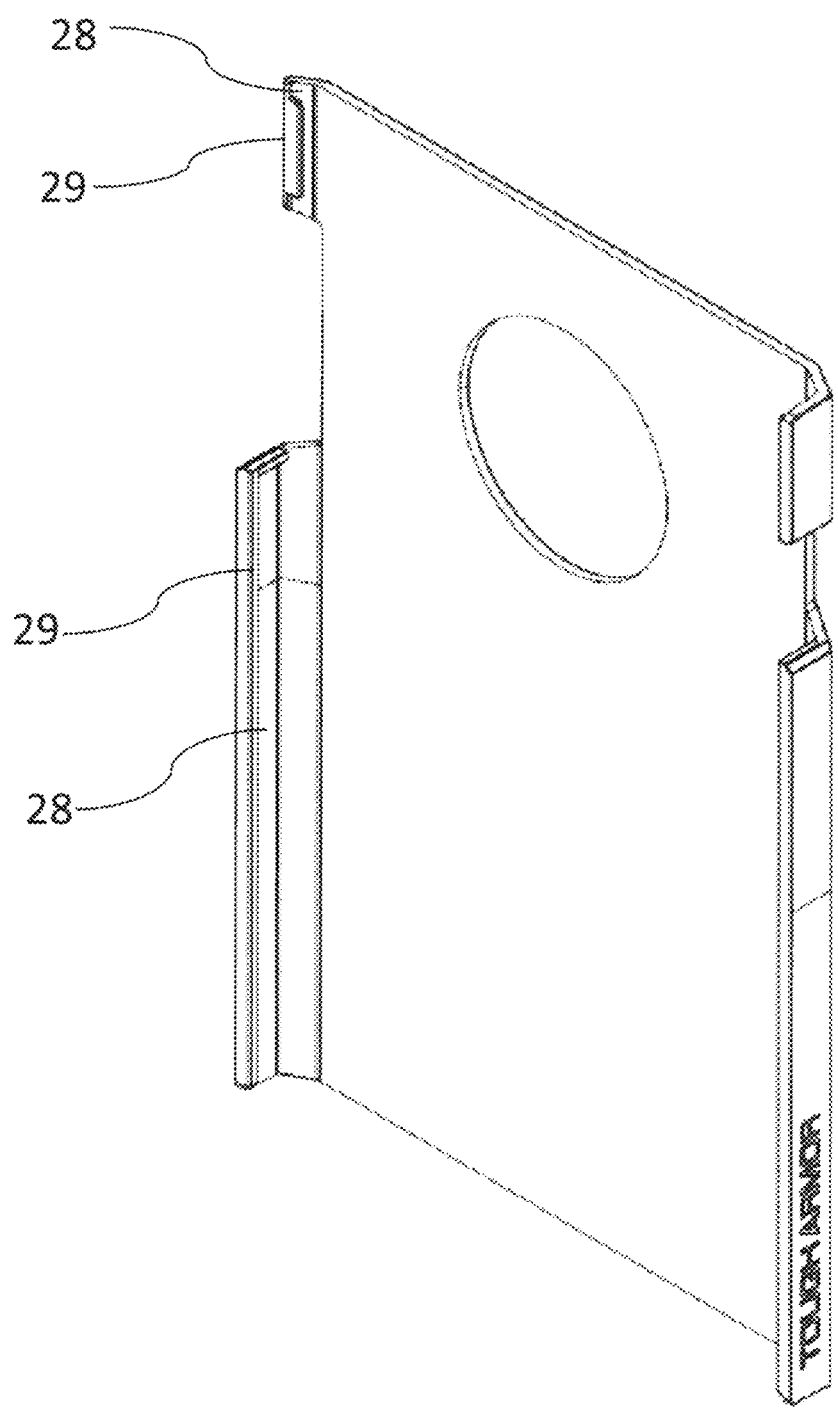
FIG. 27 shows a front perspective view of the protective frame according to the present invention.
Figure 28:
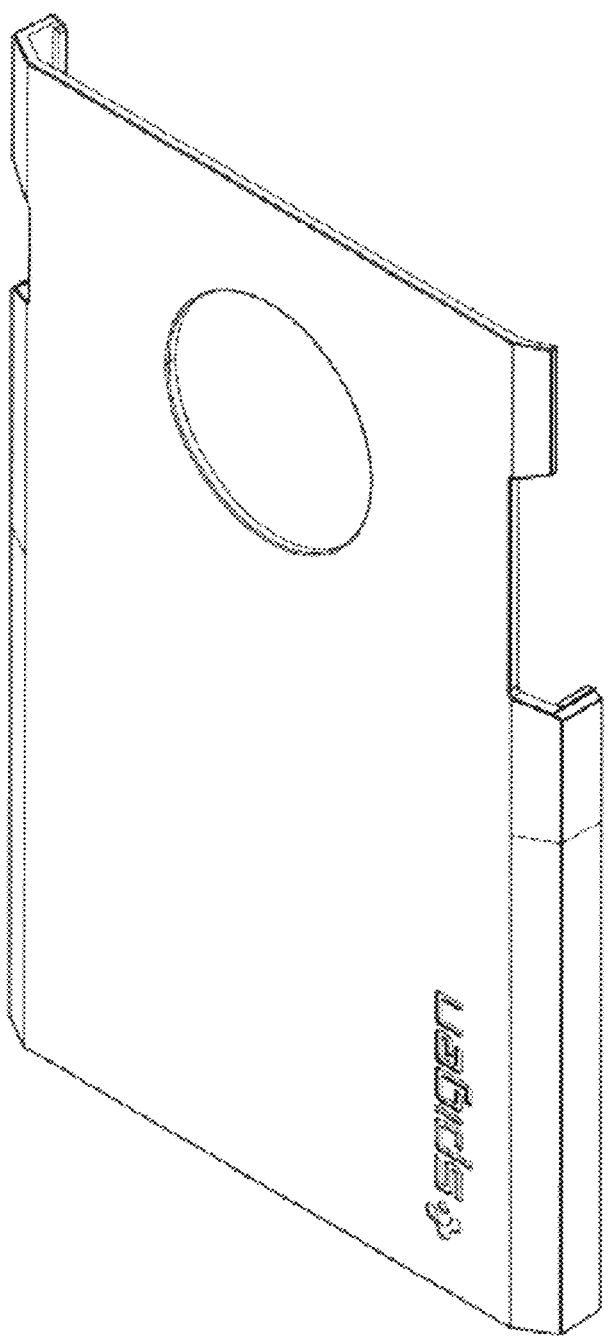
FIG. 28 shows a rear perspective view of the protective frame according to the present invention.
Figure 31:
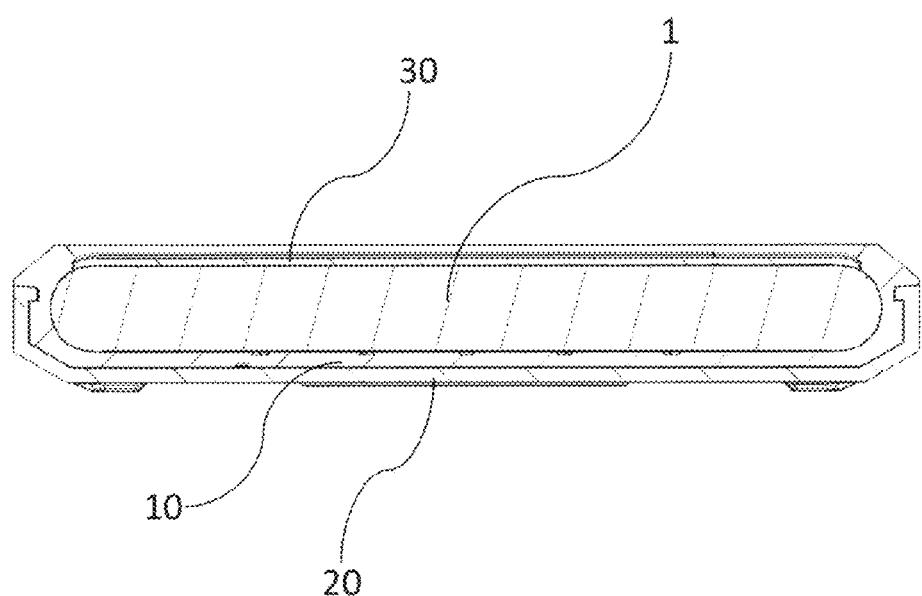
FIG. 31 shows a cross-sectional view according to one embodiment of the present invention.
Figure 32:
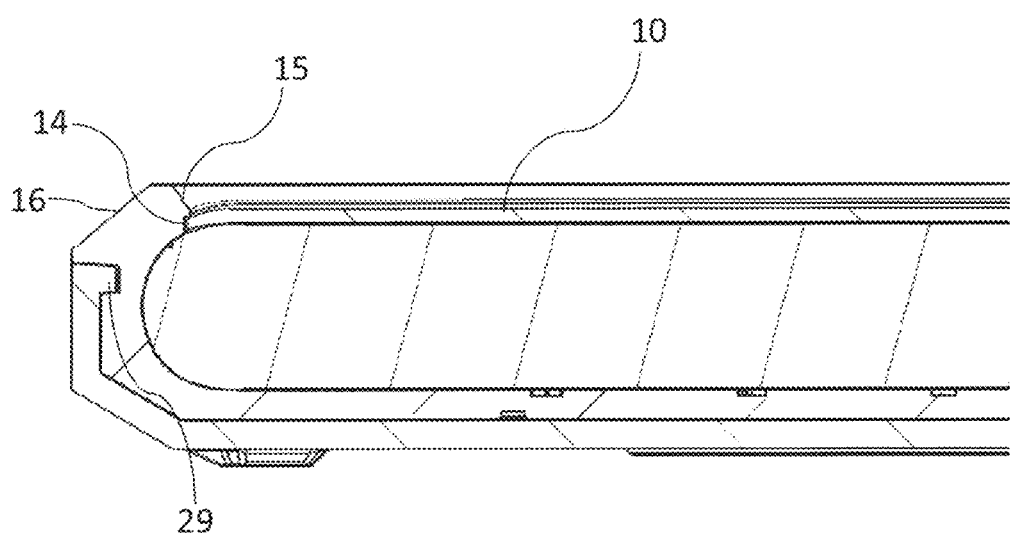
FIG. 32 shows a partial enlarged view of FIG. 31.

FIGS. 11 through 12 show perspective views of the protective film 30. The protective film 30 is attached to the front portion 4 of the electronic device 1. As shown in FIGS. 31 and 32, the edges of the protective film 30 may be curved and securely received by the inverted "L"-shaped recess 14. When the edges of the protective film 30 are curved, the edges may be detached from the electronic device 1, but the inverted "L"-shaped recess 14 securely holds the edges to prevent them from being detached.

Figure 37:
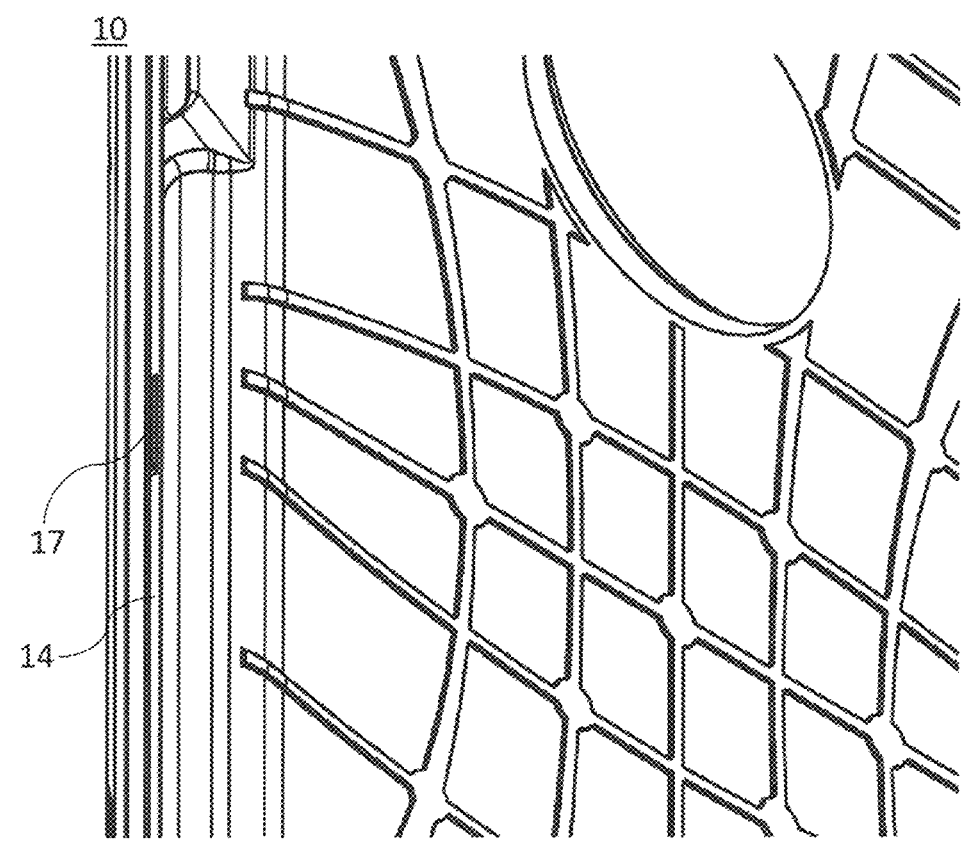
FIG. 37 shows a partial enlarged view of FIG. 19 according to the present invention.

The protective shell 10 may further comprise grooves 17 formed on the inverted "L"-shaped recess 14 as shown in FIG. 37 and the protective film 30 may further comprise mating protrusions 37 such that the mating protrusions 37 mate with the grooves 17. Because of the coupling between the grooves 17 and the mating protrusions 37, the protective film 30 and its edges can be securely held in place by the protective shell 10. Preferably, such grooves 17 and mating protrusions 37 are respectively formed on all four sides of the protective shell 10 and all four edges of the protective film 30.

The inverted shaped recess 14 receives edges of the protective film 30 and the grooves 17 receives the mating protrusions 37. In the alternative, the mating protrusions 37, instead of edges of the protective film 30 may be received in the inverted shaped recess 14.

The inverted "L"-shaped recess 14 has a vertical side and a horizontal side. Preferably, the grooves 17 are formed on the vertical side of the inverted "L"-shaped recess 14 and substantially in contact with inner edges of the inverted "L"-shaped recess 14. Here, the inner edge is the bordering line between the vertical side and horizontal side of the inverted "L"-shaped recess 14.

FIGS. 21 through 28 show various views of the protective frame 20.

The protective frame 20 is configured to removably mount over the side wall 13 and additionally the bottom 12 of the protective shell 10.

The protective shell 10 may comprise a plurality of indentations 18 formed on the side wall 13 of the protective shell 10 and the protective frame 20 may comprise complementary structures 28 to be received in the indentations 18. The indentations 18 are formed on the outer side of the side wall 13, and the outer side of the protective frame 20 may be substantially flush with the side of the protective shell 10 to form a substantially continuous contour of the side of the case 100.

The protective shell 10 may further comprise a plurality of recesses 19 formed on the indentations 18 and the protective frame 20 may further comprise complementary protrusions 29 to be received in the plurality of recesses 19. Because of this coupling between the recesses 19 and the complementary protrusions 29, the protective frame 20 can securely and tightly mount over the protective shell 10. The protective frame 20 is sufficiently tensile enough to mount over the protective shell 10 and to be removed therefrom. In addition, the recesses 19 are preferably formed on edges of the indentations 18 and lengthwise along the edges of the indentations 18.

The protective shell 10 may further include a depression 40 formed on the outer surface of the bottom 12 of the protective shell 10 for receiving the protective frame 20 therein. By this construction, the back of the protective frame 20 may become substantially flush with a non-depression area of the outer surface of the bottom 12.

Figure 29:
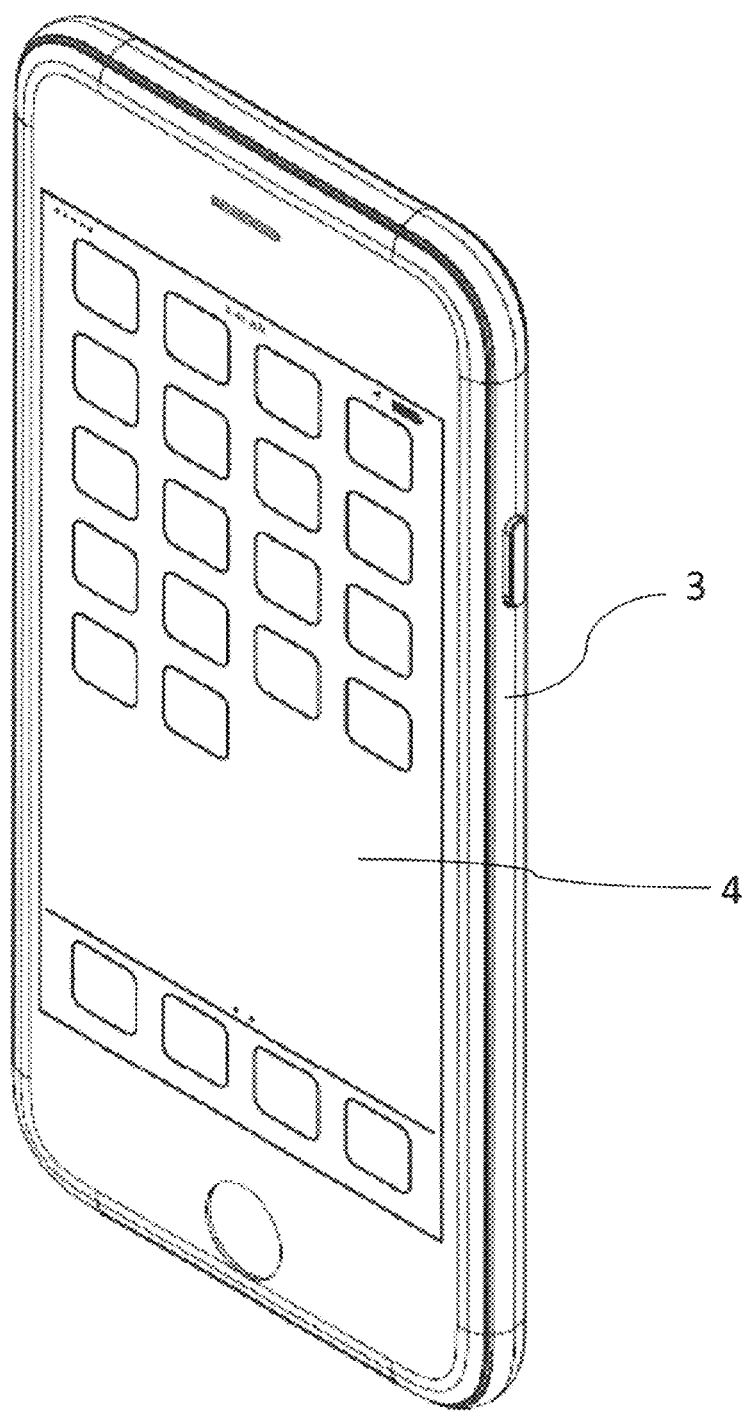
FIG. 29 shows a front perspective view of an electronic device.
Figure 30:
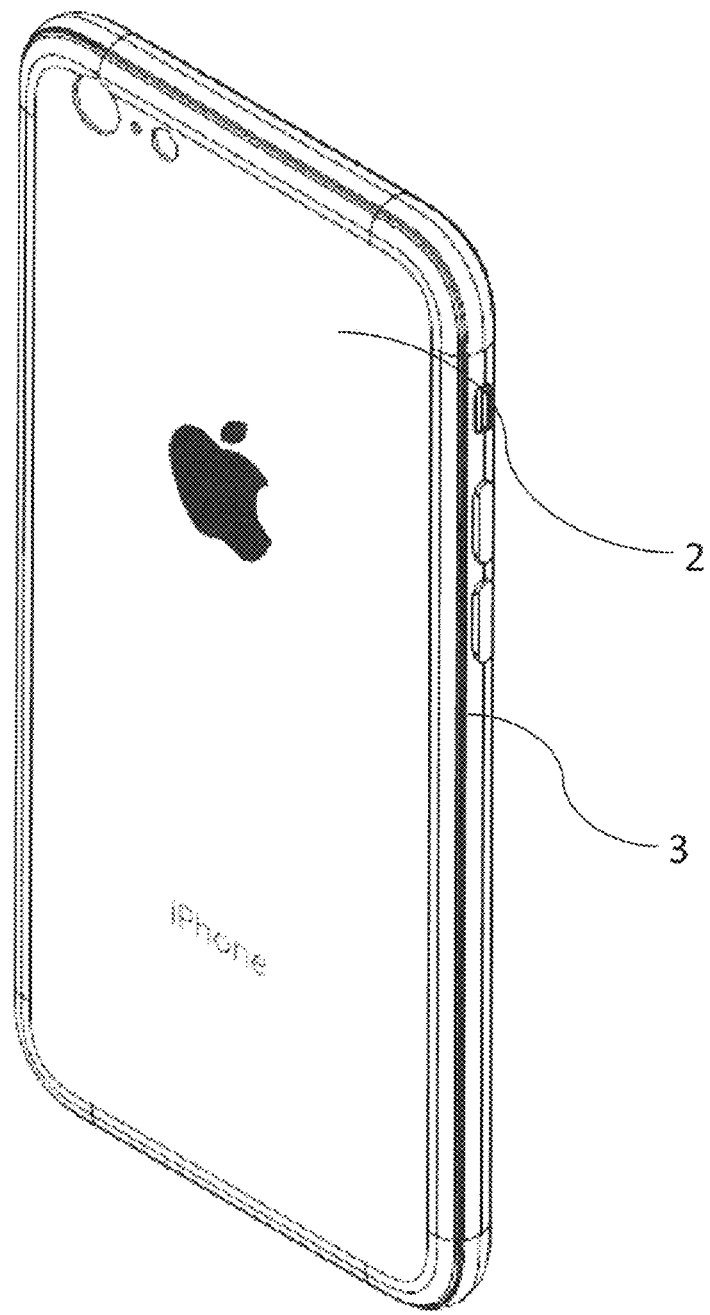
FIG. 30 shows a rear perspective view of an electronic device.

FIGS. 29 and 30 show perspective views of an electronic device 1 (iPhone 6™).

The protective shell 10 may further comprise four legs 51, 52, 53 and 54 formed on the non-depression area of the outer surface of the bottom 12. The legs 51, 52, 53 and 54 prevent the protective frame 20 from being directly in contact with a surface where the case 100 is placed.

The protective shell 10 is made of soft material and the protective frame 20 is made of hard material. Preferably, the protective shell 10 is made of thermoplastic polyurethane and the protective frame 20 is made of polycarbonate.

If the protective shell 10 is made of soft material, the edges of the protective film 30 may be dislodged from the inverted "L"-shaped recess 14. However, the hard protective frame 20 presses the side wall 13 of the protective shell 10 towards the direction of the electronic device 1, and thus, the edges of the protective film 30 can be securely and tightly held in the inverted "L"-shaped recess 14.

The protective film 30 may be made of polycarbonate, tempered glass, or polyethylene terephthalate. The protective film 30 may be coated with a UV (ultraviolet) curable coating. The coated side of the protective film 30 is preferably in contact with the screen of the electronic device 1. The UV coating reduces glare and improves wear or scratch resistance.

Figure 33:
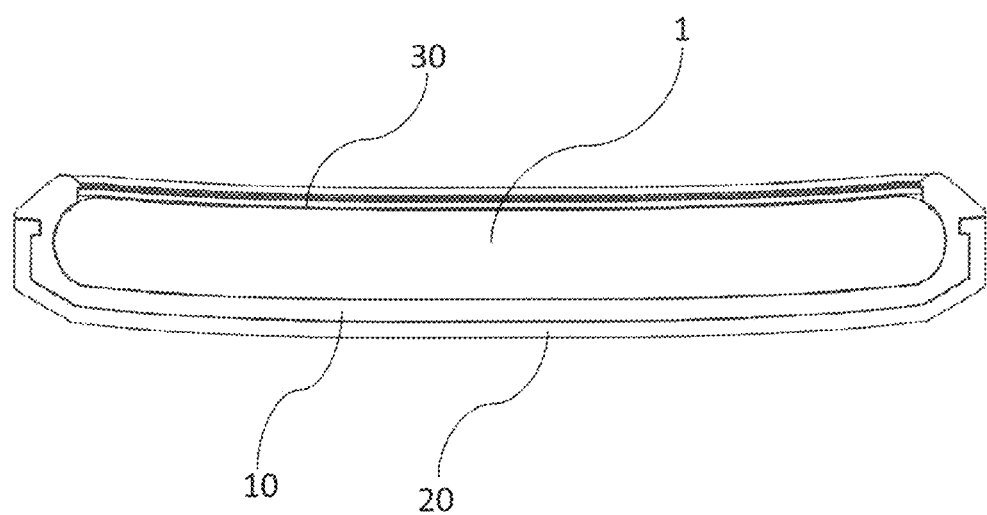
FIG. 33 shows a cross-sectional view according to another embodiment of the present invention.
Figure 34:
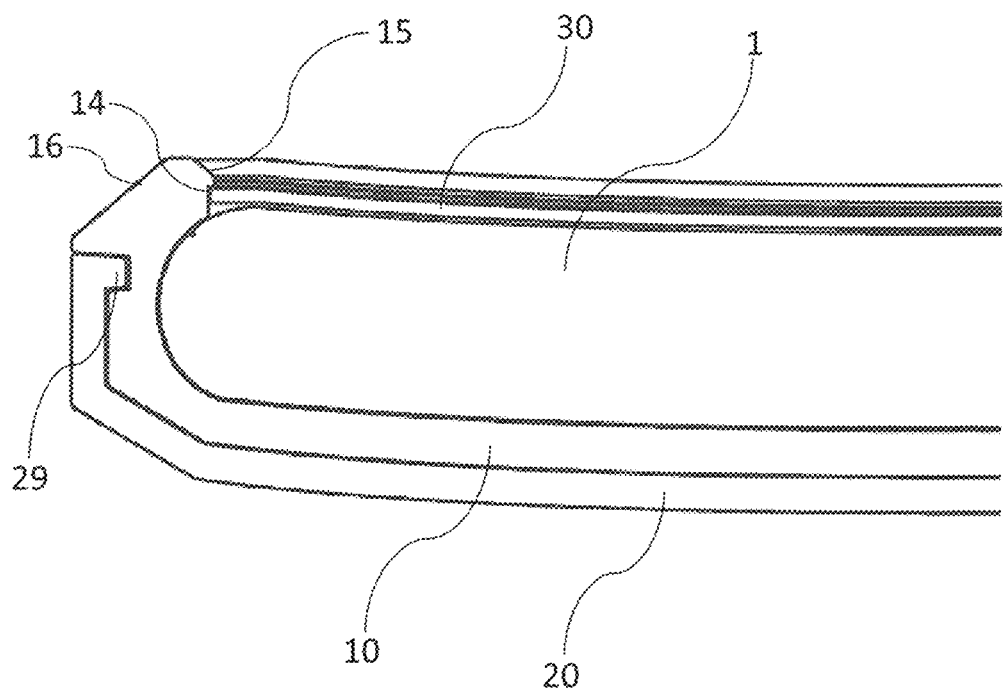
FIG. 34 shows a partial enlarged view of FIG. 33.
Figure 35:
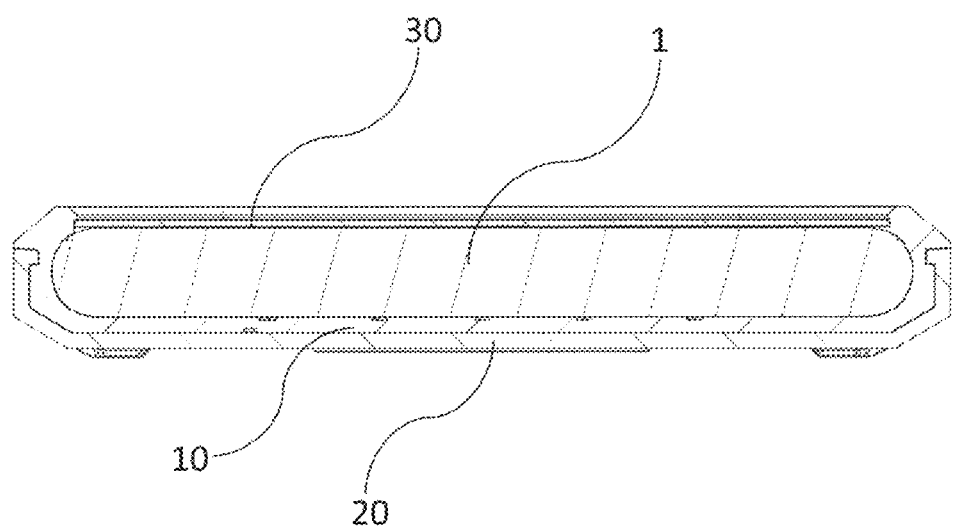
FIG. 35 shows a cross-sectional view according to still another embodiment of the present invention.
Figure 36:
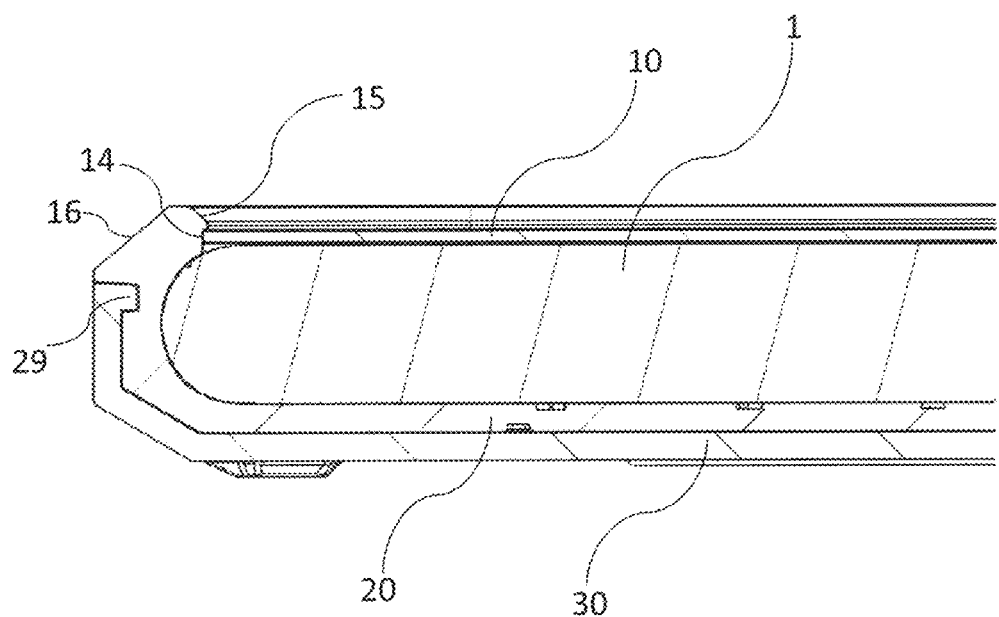
FIG. 36 shows a partial enlarged view of FIG. 35.

FIGS. 31 through 36 show various cross-sectional views of the case. In FIGS. 35 and 36, the screen of the electronic device 1 is flat and the edges of the protective film 30 are flat as well. However, in FIGS. 31 and 32, the edges of the screen of the electronic device 1 are curved and the edges of the protective film 30 are curved as well. In FIGS. 33 and 34, the screen of the electronic device 1 is concave and the protective film 30 is concavely attached to the screen. In all three embodiments, the edges of the protective film 30 are securely held by the inverted "L"-shaped recess 14.

FIGS. 38 through 43 show alternative embodiment of the present invention. Here, the case further comprises a film frame 60 for covering the protective film 30 and the front portion of the electronic device 1.

Figure 38:
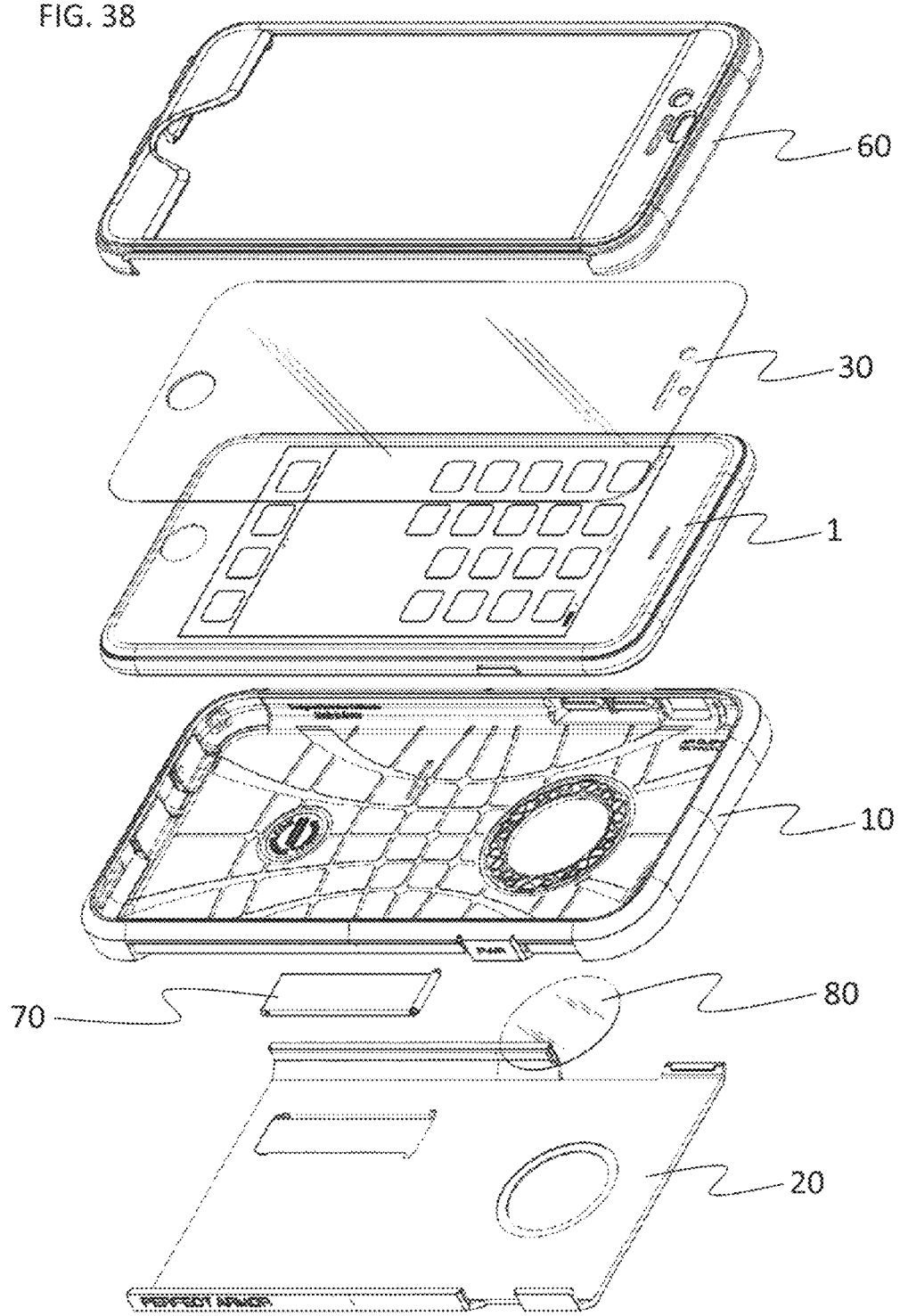
FIG. 38 shows an exploded view of alternative embodiment of the present invention.
Figure 39:
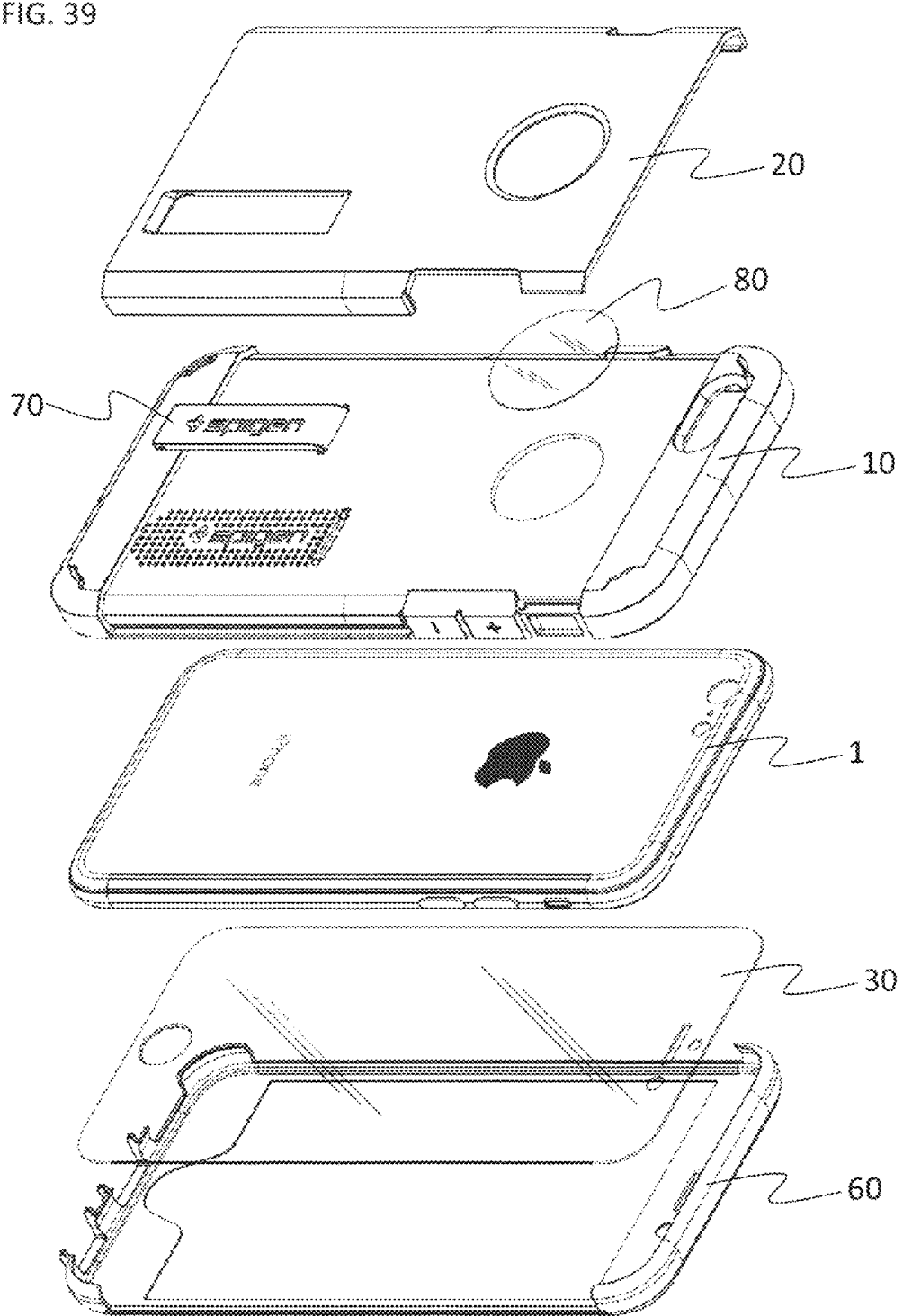
FIG. 39 shows another exploded view of the case of FIG. 38.

FIG. 38 shows a front perspective exploded view of alternative embodiment of the present invention and FIG. 33 shows a rear perspective exploded view of the case.

Figure 40:
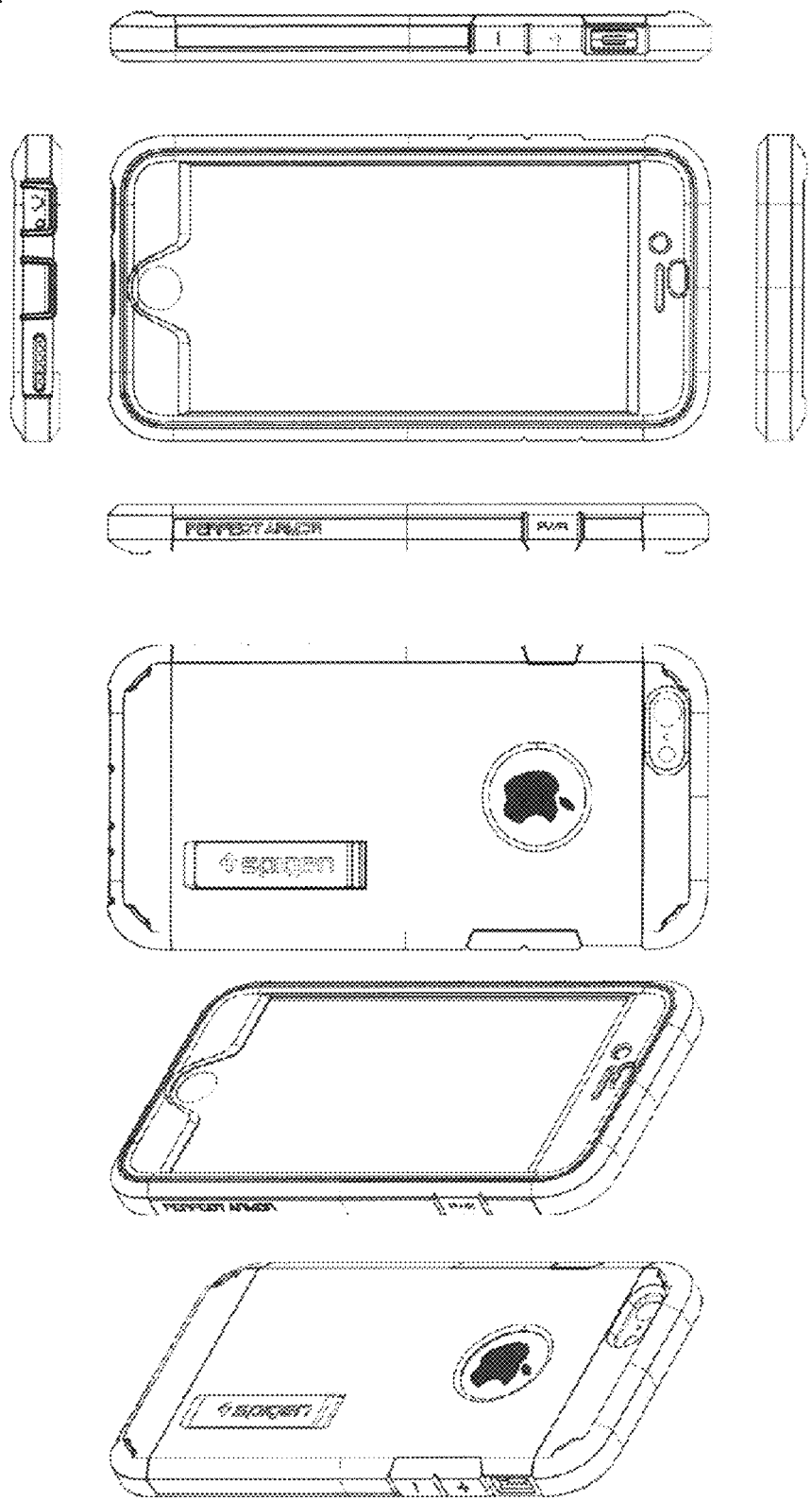
FIG. 40 shows front, left side, right side, top, bottom, rear, front perspective and rear perspective views of the case of FIG. 38.
Figure 41A:
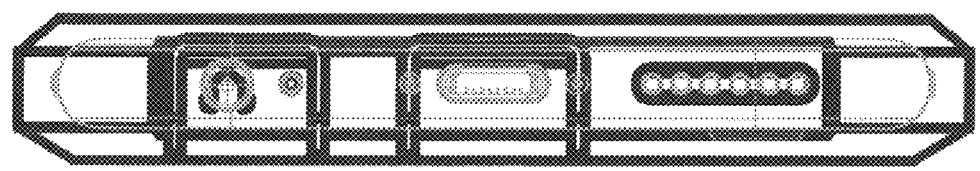
FIGS. 41A, 41B, and 41C show a bottom view and cross-sectional views of the case of FIG. 38.
Figure 41B:
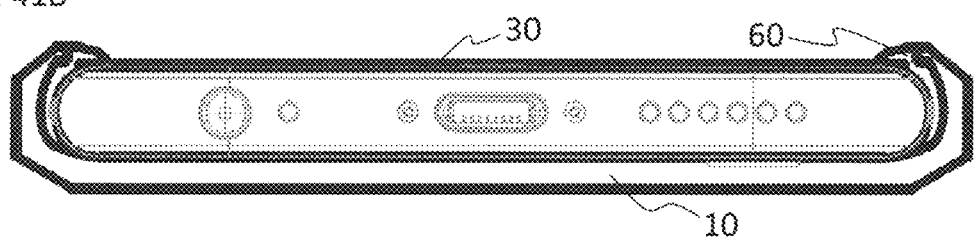
Figure 41C:
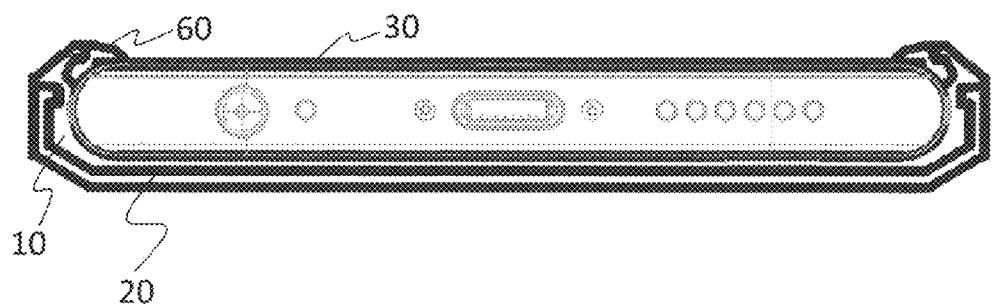
Figure 42A:
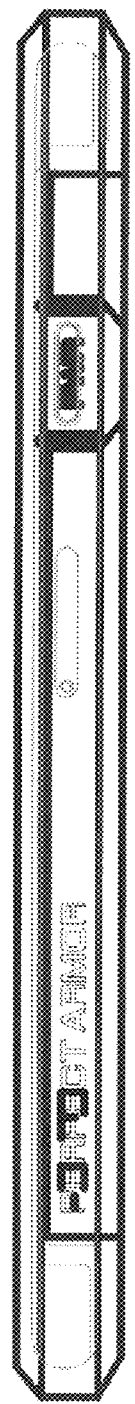
FIGS. 42A, 42B, and 42C show a side view and cross-sectional views of the case of FIG. 38.
Figure 42B:
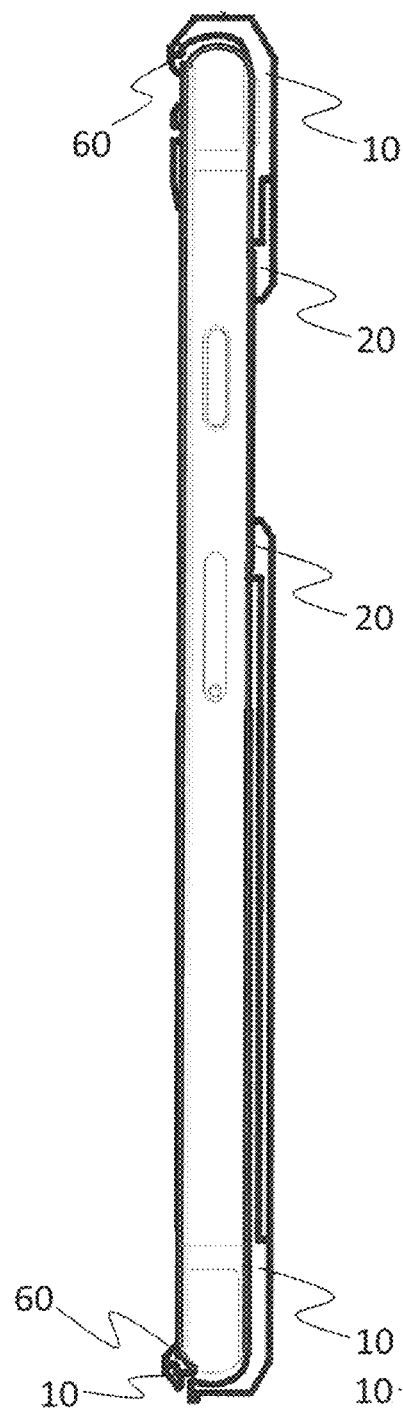
Figure 42C:
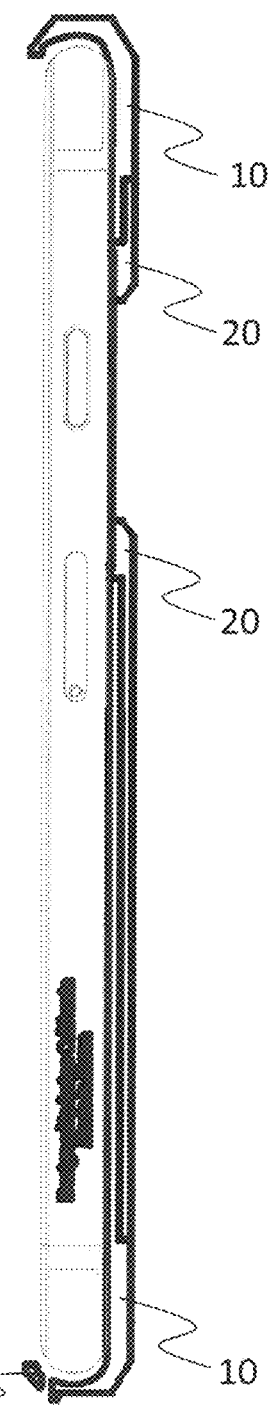
Figure 43:
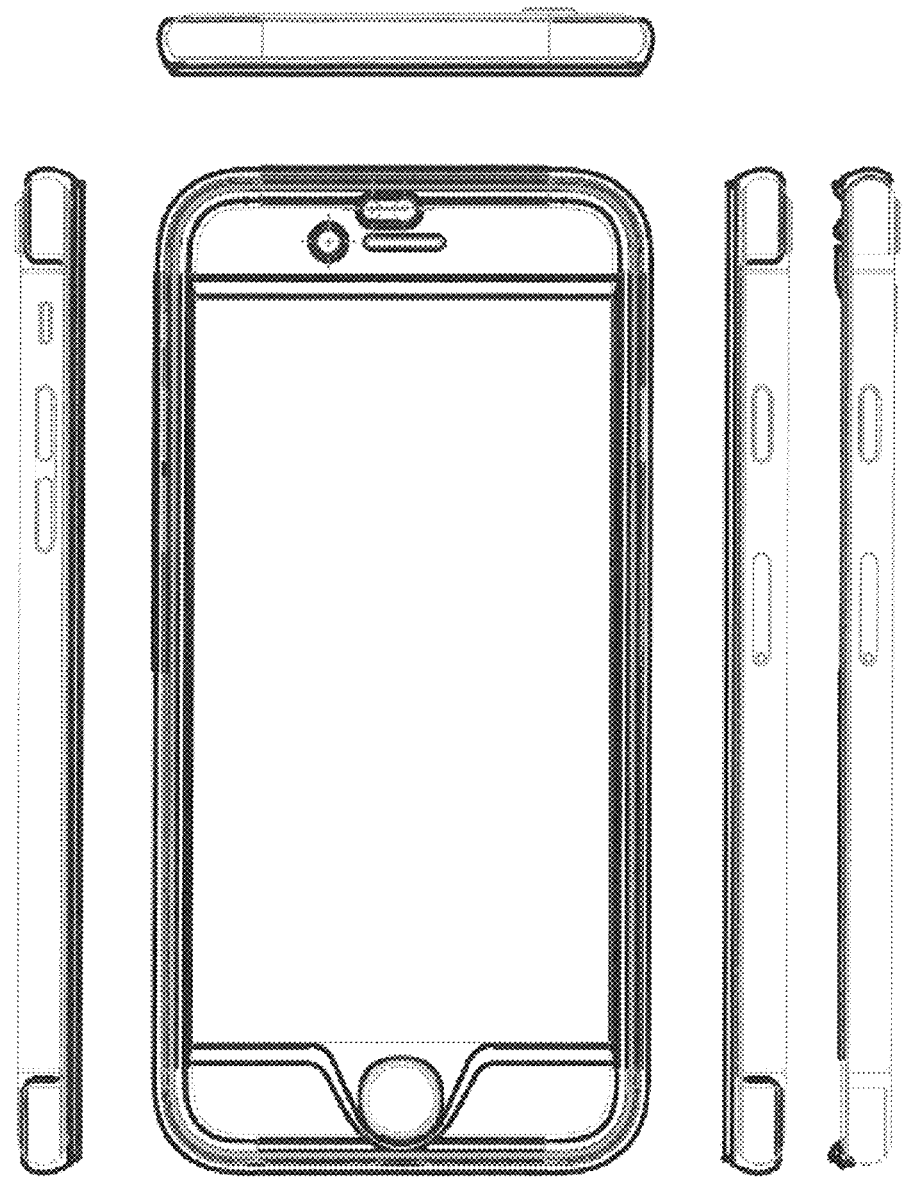
FIG. 43 shows front, left side, right side, top and bottom views of the film frame of the case of FIG. 38.

FIG. 40 shows front, left side, right side, top, bottom, rear, front perspective and rear perspective views of the case. In addition, FIGS. 41A, 41B, and 41C show a bottom view and cross-sectional views of the case and FIGS. 42A, 42B, and 42C show a side view and cross-sectional views of the case. FIG. 43 shows front, left side, right side, top and bottom views of the film frame 60 of the case. Here, the electronic device 1 is drawn in green.

The case having a protective film 30 for an electronic device 1 comprises: a protective shell 10 for protecting the electronic device 1 installed therein, significantly covering back and side portions of the electronic device 1 and without significantly covering a front portion of the electronic device 1 wherein the protective shell 10 comprises a bottom 12 covering the back portion of the electronic device 1 and a side wall 13 extending from the bottom and covering the side portion of the electronic device 1; a protective frame 20 configured to removably mount over the side wall of the protective shell 10; a protective film 30 for covering the front portion of the electronic device 1; and a film frame 60 for covering the protective film 30 and the front portion of the electronic device 1.

The case may further comprise a standing leg 70 for supporting the electronic device 1 so that the electronic device can stand. The standing leg 70 is pivoted with the protective frame 20 and rotatable with respect to the protective frame 20. The U.S. Provisional Patent Application No. 62/063,292, entitled "Case having Standing Leg for Electronic Devices" describes details on the standing leg 70 and the content of which is incorporated herein in its entirety by reference.

The case may further comprise a round transparent film 80 received in a round recess formed on the protective frame 20. The protective frame 20 has a round aperture and the protective shell 10 also has a round aperture on the location corresponding to the round aperture of the protective frame 20. The round recess may be formed around the round aperture of the protective frame 20 (FIG. 38) or the protective shell 10 (not shown).

The film frame 60 is received and secured in between sides of the protective shell 10 and the electronic device 1. The film frame 60 can be inserted in between the protective shell 10 and the electronic device 1 because the protective shell 10 is soft and flexible. However, once the film frame 60 is inserted, it is tightly secured in there.

Top and bottom sides of the film frame 60 may be inserted and secured in between the protective shell 10 and the electronic device 1. Alternatively, four corner sides of the film frame 60 may be inserted and secured in between the protective shell 10 and the electronic device 1. These alternatives are example only and various constructions can be possible.

Preferably, the protective film 30 is attached to the film frame 60 by a double-sided tape. Preferably, the film frame 60 is made of polycarbonate.

In FIGS. 41A, 41B, 41C, 42A, 42B, 42C and 43, green lines show the electronic device 1.

While the invention has been shown and described with reference to different embodiments thereof, it will be appreciated by those skilled in the art that variations in form, detail, compositions, and operation may be made without departing from the spirit and scope of the invention as defined by the accompanying claims.

What is claimed is:

1. A case having a protective film for an electronic device, comprising:
   a protective shell for protecting the electronic device installed therein, covering a back portion and a side portion of the electronic device and without covering a front portion of the electronic device wherein the protective shell comprises a bottom covering the back portion of the electronic device, and a side wall extending from the bottom and covering the side portion of the electronic device; and
   a protective frame configured to removably mount over the side wall of the protective shell;
wherein the protective film for covers the front portion of the electronic device,
wherein the protective shell further comprises an inverted "L"-shaped recess for receiving edges of the protective film, wherein the protective shell further comprises grooves formed on the inverted "L"-shaped recess and the protective film comprises mating protrusions wherein the mating protrusions mate with the grooves,
wherein the grooves are formed on a vertical side of the inverted "L"-shaped recess and in contact with inner edges of the inverted "L"-shaped recess, wherein the protective film is attached to the front portion of the electronic device.

2. The case of claim 1, wherein the side wall of the protective shell comprises an inner bevel and an outer bevel.

3. The case of claim 2, wherein the inverted "L"-shaped recess is formed right below the inner bevel of the side wall.

4. The case of claim 1, wherein the edges of the protective film are curved and securely received by the inverted "L"-shaped recess.

5. The case of claim 1, wherein the inverted "L"-shaped recess is formed continuously along four sides of the side wall.

6. The case of claim 1, wherein the protective frame is configured to removably mount over the side wall and the bottom of the protective shell.

7. The case of claim 6, wherein the protective shell comprises a plurality of indentations formed on the side wall of the protective shell and the protective frame has complementary structures to be received in the indentations.

8. The case of claim 7, wherein a side of the protective frame and a side of the protective shell are flush with each other.

9. The case of claim 7, wherein the protective shell further comprises a plurality of recesses formed on the indentations and the protective frame comprises complementary protrusions to be received in the plurality of recesses.

10. The case of claim 9, wherein the recesses are formed on edges of the indentations.

11. The case of claim 7, wherein the protective shell further comprises a depression formed on the bottom of the protective shell for receiving the protective frame therein.

12. The case of claim 11, wherein a back of the protective frame is flush with a non-depression area of the bottom of the protective shell.

13. The case of claim 12, wherein the protective shell further comprises four legs formed on the non-depression area.

14. The case of claim 1, wherein the protective shell is made of soft material and the protective frame is made of hard material.

15. The case of claim 14, wherein the protective shell is made of thermoplastic polyurethane and the protective frame is made of polycarbonate.

16. The case of claim 1, wherein the protective film is made of polycarbonate, tempered glass, or polyethylene terephthalate.

17. The case of claim 1, wherein the protective film is coated with a UV (ultraviolet) curable coating.

18. A case having a protective film for an electronic device, comprising:
   a protective shell for protecting the electronic device installed therein, covering a back and a side portion of the electronic device and without covering a front portion of the electronic device wherein the protective shell comprises a bottom covering the back portion of the electronic device and a side wall extending from the bottom and covering the side portion of the electronic device;
   a protective frame configured to removably mount over the side wall of the protective shell; and
   a film frame for covering edges of the protective film and the front portion of the electronic device,
wherein the protective film covers the front portion of the electronic device.

19. The case of claim 18, further comprising a standing leg pivoted with and rotatable with respect to the protective frame.

20. The case of claim 18, further comprising a round transparent film received in a round recess formed on the protective frame.

21. The case of claim 18, wherein the protective film is attached to the film frame by a double-sided tape.

* * * * *